United States Patent
Chen et al.

(10) Patent No.: US 11,533,498 B2
(45) Date of Patent: Dec. 20, 2022

(54) GEOMETRIC PARTITIONING MODE IN VIDEO CODING

(71) Applicant: Tencent America LLC, Palo Alto, CA (US)

(72) Inventors: Lien-Fei Chen, Taipei (TW); Xiang Li, Saratoga, CA (US); Guichun Li, Milpitas, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/091,253

(22) Filed: Nov. 6, 2020

(65) Prior Publication Data

US 2021/0160520 A1 May 27, 2021

Related U.S. Application Data

(60) Provisional application No. 62/938,894, filed on Nov. 21, 2019.

(51) Int. Cl.
*H04N 19/105* (2014.01)
*H04N 19/119* (2014.01)
(Continued)

(52) U.S. Cl.
CPC .......... *H04N 19/44* (2014.11); *H04N 19/132* (2014.11); *H04N 19/137* (2014.11); *H04N 19/176* (2014.11); *H04N 19/70* (2014.11)

(58) Field of Classification Search
CPC .... H04N 19/44; H04N 19/132; H04N 19/137; H04N 19/176; H04N 19/70
(Continued)

(56) References Cited

U.S. PATENT DOCUMENTS 11,412,221 B2 * 8/2022 Liao .................... H04N 19/124
2012/0177106 A1 7/2012 Divorra Escoda et al.
(Continued)

FOREIGN PATENT DOCUMENTS

EP 2446627 B1 9/2017
WO 2008016609 A2 2/2008

OTHER PUBLICATIONS

Australian Office Action dated Jun. 29, 2022 in Application No. 2020387376, pp. 1-3.
(Continued)

*Primary Examiner* — Albert Kir
(74) *Attorney, Agent, or Firm* — ArentFox Schiff LLP

(57) ABSTRACT

A method of video decoding including receiving a syntax element from a bitstream of a coded video associated with a current coding block that is partitioned into a first part and a second part along a partition edge for prediction in a geometric partitioning mode, and determining a weight index at a sample position of the current coding block. A stored motion vector type for a first motion storage unit in a motion field of the current coding block is determined based on a motion index of the first motion storage unit. The weight index at the sample position of the current coding block is used as the motion index of the first motion storage unit. The motion field of the current coding block can be stored based on the stored motion vector type determined for the first motion storage unit in the motion field of the current coding block.

12 Claims, 14 Drawing Sheets

(51) Int. Cl.
*H04N 19/132* (2014.01)
*H04N 19/44* (2014.01)
*H04N 19/176* (2014.01)
*H04N 19/70* (2014.01)
*H04N 19/137* (2014.01)

(58) Field of Classification Search
USPC .................................................... 375/240.25
See application file for complete search history.

(56) References Cited

U.S. PATENT DOCUMENTS

| | | |
|---|---|---|
| 2020/0208827 A1 | 7/2020 | Jiang et al. |
| 2021/0006788 A1* | 1/2021 | Zhang .................... H04N 19/52 |
| 2021/0006790 A1* | 1/2021 | Zhang .................. H04N 19/176 |
| 2021/0092392 A1* | 3/2021 | Reuze .................. H04N 19/119 |
| 2021/0235073 A1* | 7/2021 | Liu ........................ H04N 19/86 |
| 2021/0250602 A1* | 8/2021 | Zhang .................... H04N 19/61 |
| 2021/0258574 A1* | 8/2021 | Gao ..................... H04N 19/136 |
| 2022/0070443 A1* | 3/2022 | Chen ................. G11B 33/1486 |
| 2022/0248044 A1* | 8/2022 | Chen ................... H04N 19/176 |
| 2022/0256166 A1* | 8/2022 | Deng .................... H04N 19/70 |

OTHER PUBLICATIONS

Indian Office Action dated Jun. 28, 2022 in Application No. 202147046664, pp. 1-5.

\* cited by examiner

| Merge Index | L0 MV | L1 MV |
|---|---|---|
| 0 | X | |
| 1 | | X |
| 2 | X | X |
| 3 | | X |
| 4 | X | |

FIG. 9

GEOMETRIC PARTITIONING MODE IN VIDEO CODING

INCORPORATION BY REFERENCE

This present application claims the benefit of U.S. Provisional Application No. 62/938,894, "SIMPLIFICATION FOR GEO/WEDGE INTER BLOCK" filed on Nov. 21, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as inter prediction. For each inter-predicted coding unit (CU), motion parameters include motion vectors, reference picture indices and reference picture list usage index, and additional information to be used for inter-predicted sample generation. The motion parameters can be signaled in an explicit or implicit manner. When a CU is coded with skip mode, the CU is associated with one prediction unit (PU) and has no significant residual coefficients, no coded motion vector delta or reference picture index. A merge mode is specified whereby the motion parameters for a current CU are obtained from neighboring CUs, including spatial and temporal candidates, and additional schedules introduced, for example in VVC. The merge mode can be applied to any inter-predicted CU, not only for skip mode. The alternative to merge mode is the explicit transmission of the motion parameters. Motion vector, corresponding reference picture index for each reference picture list and reference picture list usage flag and other needed information are signaled explicitly per each CU.

Some inter prediction coding tools include extended merge prediction, merge mode with motion vector difference (MMVD), advanced motion vector prediction mode (AMVP) with symmetric motion vector difference (MVD) signaling, affine motion compensated prediction, subblock-based temporal motion vector prediction (SbTMVP), adaptive motion vector resolution (AMVR), motion field storage (1/16th luma sample MV storage and 8×8 motion field compression), bi-prediction with weighted averaging (BWA), bi-directional optical flow (BDOF), decoder side motion vector refinement (DMVR), triangular partitioning mode (TPM), and combined inter and intra prediction (CIIP).

In some cases, extended merge prediction is used. A merge candidate list is constructed by including the following five types of candidates in order: (1) spatial MVP from spatial neighbor CUs; (2) temporal MVP from collocated CUs; (3) history-based MVP from an FIFO table; (4) pair-wise average MVP; and (5) zero MVs.

The size of the merge list is signaled in a slice header and the maximum allowed size of the merge list is for example 6 in some cases. For each CU code in merge mode, an index of the best merge candidate is encoded using truncated unary binarization (TU). The first bin of the merge index is coded with context and bypass coding is used for other bins.

FIG. 1A shows exemplary positions of spatial merge candidates. In some cases, up to four merge candidates can be selected among candidates located in the positions depicted in FIG. 1A. The selection order is B1, A1, B0, A0, and B2. The candidate at position B2 is considered only when any CU at positions A0, B0, B1, or A1 is not available (e.g., the CU at position A0 belongs to another slice or tile) or not inter coded. After the candidate at position A1 is added to the merge candidate list, the addition of the remaining candidates is subject to a redundancy check that ensures that candidates with same motion information are excluded from the merge candidate list so that coding efficiency is improved.

FIG. 1B shows candidate pairs considered for the redundancy check of the spatial merge candidates. To reduce computational complexity, not all possible candidate pairs are considered in the redundancy check. Instead, only the pairs linked with an arrow in FIG. 1B are considered and a candidate is only added to the merge candidate list if the corresponding candidate used for the redundancy check has not the same motion information.

FIG. 1C shows a motion vector scaling for a temporal merge candidate. In some cases, only one temporal merge candidate can be added to the merge candidate list. Particularly, in the derivation of this temporal merge candidate, a scaled motion vector is derived based on a co-located CU belonging to the collocated reference picture. The reference picture list used for the derivation of the co-located CU is explicitly signaled in the slice header. The scaled motion vector for the temporal merge candidate is obtained as illustrated by the dotted line in FIG. 1C. The scaled motion vector is derived from the motion vector of the co-located CU using the picture order count (POC) distances tb and td, where tb is defined as the POC difference between a reference picture of the current picture and the current picture and td is defined as the POC difference between a reference picture of the co-located picture and the co-located picture. The reference picture index of the temporal merge candidate can be set equal to zero.

FIG. 1D shows exemplary positions for the temporal merge candidate. The temporal merge candidate is selected between CUs at positions C0 and C1. If the CU at position C0 is not available, not inter coded, or outside of the current row of CTUs, the CU at position C1 is used. Otherwise, the CU at position C0 is used in the derivation of the temporal merge candidate.

SUMMARY

Aspects of the disclosure provide methods and apparatus for video encoding and decoding. In some examples, an apparatus for video decoding includes processing circuitry. The circuitry can be configured to receive a syntax element from a bitstream of a coded video associated with a current coding block that is partitioned into a first part and a second part along a partition edge for prediction in a geometric partitioning mode, and determine a weight index at a sample position of the current coding block. The weight index is used to derive a blending weight for blending two prediction signals corresponding to the first part and the second part of the current coding block. The circuitry can further be configured to determine a stored motion vector type for a first motion storage unit in a motion field of the current coding block based on a motion index of the first motion storage unit, the weight index at the sample position of the current coding block being used as the motion index of the first motion storage unit, and store the motion field of the current coding block based on the stored motion vector type determined for the first motion storage unit in the motion field of the current coding block.

In an embodiment, the sample position of the current coding block at which the weight index is used as the motion index of the first motion storage unit is a sample position within the first motion storage unit in the motion field of the coding block. In an embodiment, the sample position of the current coding block at which the weight index is used as the motion index of the first motion storage unit is a sample position neighboring a center position of the first motion storage unit in the motion field of the coding block. In an embodiment, the first motion storage unit has a size of 4×4 samples, and the sample position of the current coding block at which the weight index is used as the motion index of the first motion storage unit is a sample position of a coordinate (2, 2) within the first motion storage unit in the motion field of the coding block.

In an embodiment, the first motion storage unit has a size of 4×4 samples and is at a position of $(x_{sb}, y_{sb})$ in the motion field of the current coding block, and the sample position of the current coding block has a coordinate of $((x_{sb} <<2)+2, (y_{sb} <<2)+2)$ in the current coding block, the weight index at the coordinate of $((x_{sb} <<2)+2, (y_{sb} <<2)+2)$ being used as the motion index of the first motion storage unit.

In an embodiment, the circuitry can further be configured to perform a calculation to convert the weight index at the sample position of the current coding block to the blending weight for blending the two prediction signals. The conversion can be based on a linear function of the weight index at the sample position of the current coding block without using a lookup table.

In an embodiment, the circuitry can further be configured to determine the weight index at the sample position of the current coding block based on a value $\rho_{margin}$ used to shift the partition edge from a corner of the current coding block, the value $\rho_{margin}$ varying according to a width or a height of the current coding block and an angel of the partition edge.

In an embodiment, the circuitry can further be configured to determine the weight index at the sample position of the current coding block based on $$wIdx(x, y) = (x - ((w \times (4n + 3i)) \gg (3 + \log_2 n))) \times \cos(\varphi) - \qquad \text{(Eq. 1)}$$

$$(y - ((h \times (4n + 3i)) \gg (3 + \log_2 n))) \times \cos\left(\varphi + \frac{\pi}{2}\right)$$

where wIdx denotes the weight index, x and y denote a coordinate of the sample position in the current coding block, w and h denote a width and a height of the current coding block, φ denotes an angle of the partition edge, n denotes a number of distance quantization steps, and i denotes a distance quantization step index.

In an embodiment, the circuitry is further configured to determine the weight index at the sample position of the current coding block based on $$wIdx(x, y) = \qquad \text{(Eq. 2)}$$
$$((((x \ll 1) + 1) \ll 3) - (((w \times (4n + 3i)) \ll 1) \gg \log_2 n)) \times$$
$$\cos[\varphi] -$$
$$((((y \ll 1) + 1) \ll 3) - (((h \times (4n + 3i)) \ll 1) \gg \log_2 n)) \times$$
$$\cos\left[\varphi + \frac{\pi}{2}\right]$$

where wIdx denotes the weight index, x and y denote a coordinate of the sample position in the current coding block, w and h denote a width and a height of the current coding block, φ denotes an angle of the partition edge, n denotes a number of distance quantization steps, and i denotes a distance quantization step index.

In an embodiment, the circuitry is further configured to determine the weight index at the sample position of the current coding block based on $$wIdx(x, y) = \begin{cases} \left(x - \frac{w \times (4n+3i)}{8n}\right) \times \cos(\varphi) - \left(y - \frac{h \times (4n+3i)}{8n}\right) \times \cos\left(\varphi + \frac{\pi}{2}\right), & \text{when } 0 \leq \varphi < \frac{\pi}{2} \\ \left(x - \frac{w \times (4n-3i)}{8n}\right) \times \cos(\varphi) - \left(y - \frac{h \times (4n+3i)}{8n}\right) \times \cos\left(\varphi + \frac{\pi}{2}\right), & \text{when } \frac{\pi}{2} \leq \varphi < \pi \\ \left(x - \frac{w \times (4n-3i)}{8n}\right) \times \cos(\varphi) - \left(y - \frac{h \times (4n-3i)}{8n}\right) \times \cos\left(\varphi + \frac{\pi}{2}\right), & \text{when } \pi \leq \varphi < \frac{3\pi}{2} \\ \left(x - \frac{w \times (4n+3i)}{8n}\right) \times \cos(\varphi) - \left(y - \frac{h \times (4n-3i)}{8n}\right) \times \cos\left(\varphi + \frac{\pi}{2}\right), & \text{when } \frac{3\pi}{2} \leq \varphi < 2\pi \end{cases} \quad \text{(Eq. 3)}$$

where wIdx denotes the weight index, x and y denote a coordinate of the sample position in the current coding block, w and h denote a width and a height of the current coding block, φ denotes an angle of the partition edge, n denotes a number of distance quantization steps, and i denotes a distance quantization step index.

In an embodiment, the circuitry is further configured to determine the weight index at the sample position of the current coding block based on a weight index of a left or upper neighboring sample of the sample position of the current coding block with a fixed offset value. In an embodiment, the circuitry is further configured to determine the weight index at the sample position of the current coding block based on a weight index at a coordinate of (0, 0) in the current coding block.

In an embodiment, the circuitry is further configured to determine a motion index of a second motion storage unit in the motion field of the current coding block based on $$motionIdx(x_{sb}, y_{sb}) = \qquad \text{(Eq. 4)}$$
$$((((x_{sb} \ll 3) + 1) \ll 3) - (((w \times (4n+3i)) \ll 1) \gg \log_2 n) + 3) \times$$
$$\cos[\varphi] -$$
$$((((y_{sb} \ll 3) + 1) \ll 3) - (((h \times (4n+3i)) \ll 1) \gg \log_2 n) + 3) \times$$
$$\cos\left[\varphi + \frac{\pi}{2}\right]$$

where motionIdx denotes the motion index of the second motion storage unit, $x_{sb}$ and $y_{sb}$ denote a coordinate of the second motion storage unit in the motion field of the current coding block, w and h denote a width and a height of the current coding block, φ denotes an angle of the partition edge, n denotes a number of distance quantization steps, and i denotes a distance quantization step index.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows a uni-prediction motion vector selection for the triangle partition mode in accordance with some embodiments;

DETAILED DESCRIPTION OF EMBODIMENTS

I. Video Encoder and Decoder

Figure 1A:
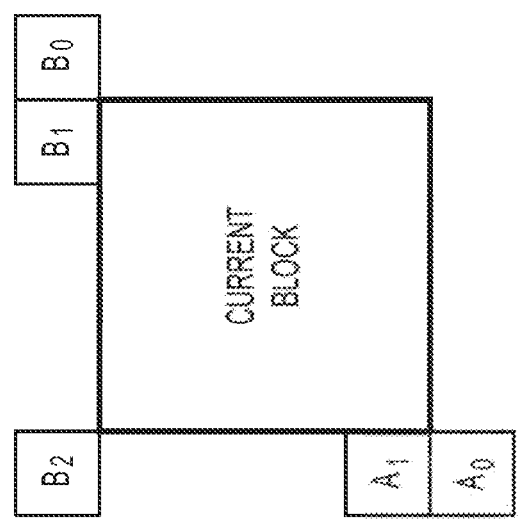
FIG. 1A shows exemplary positions of spatial merge candidates.
Figure 1B:
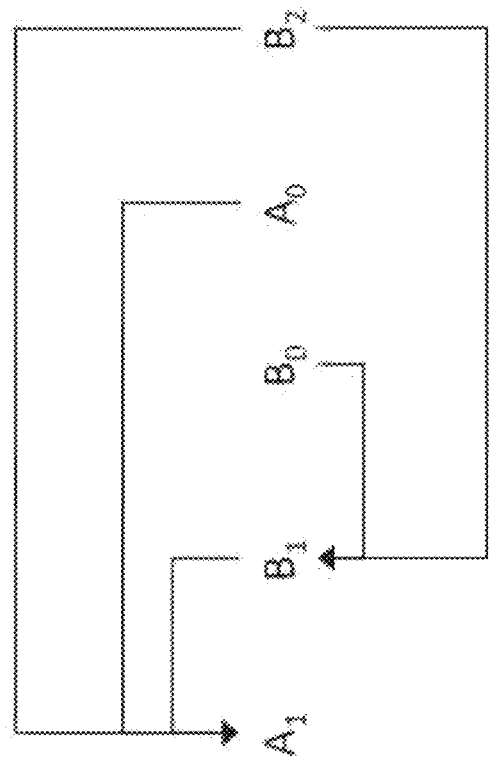
FIG. 1B shows exemplary candidate pairs considered for a redundancy check of the spatial merge candidates.
Figure 1D:
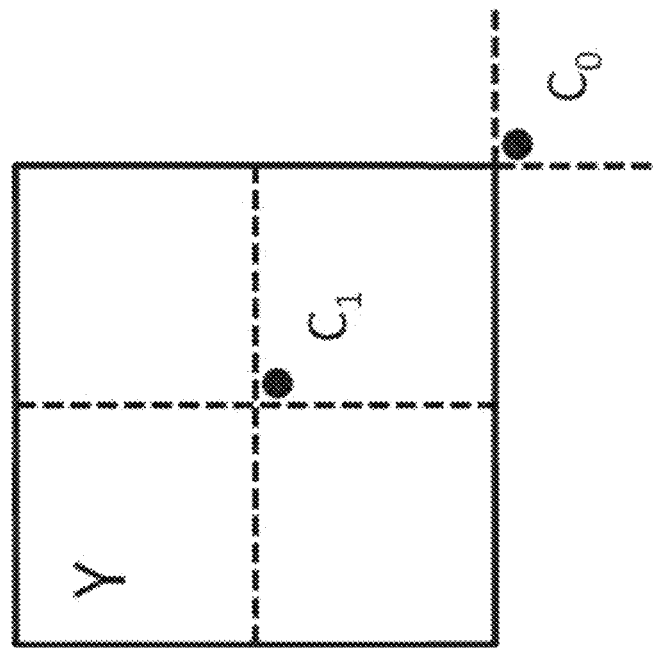
FIG. 1D shows exemplary positions for the temporal merge candidate.
Figure 1C:
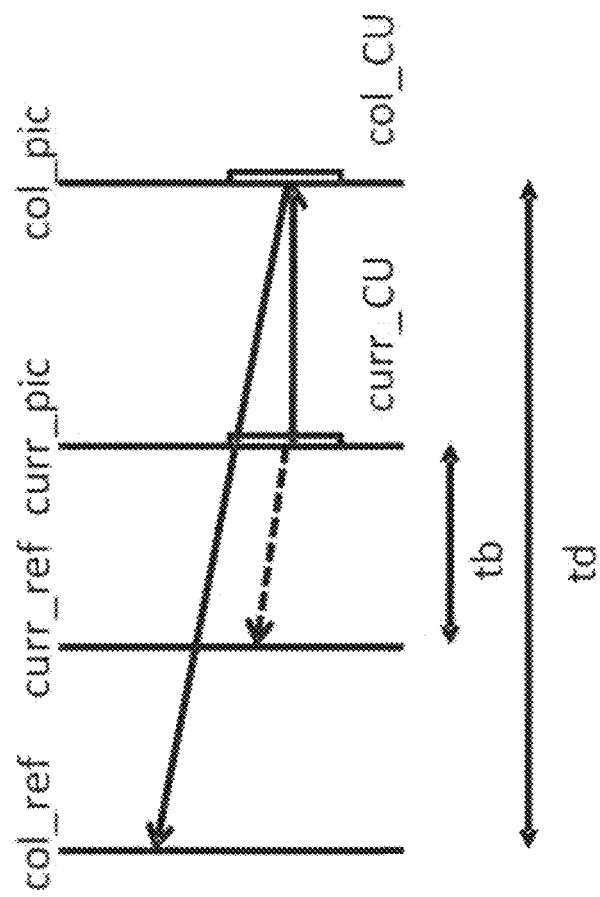
FIG. 1C shows an example of motion vector scaling for a temporal merge candidate.
Figure 2:
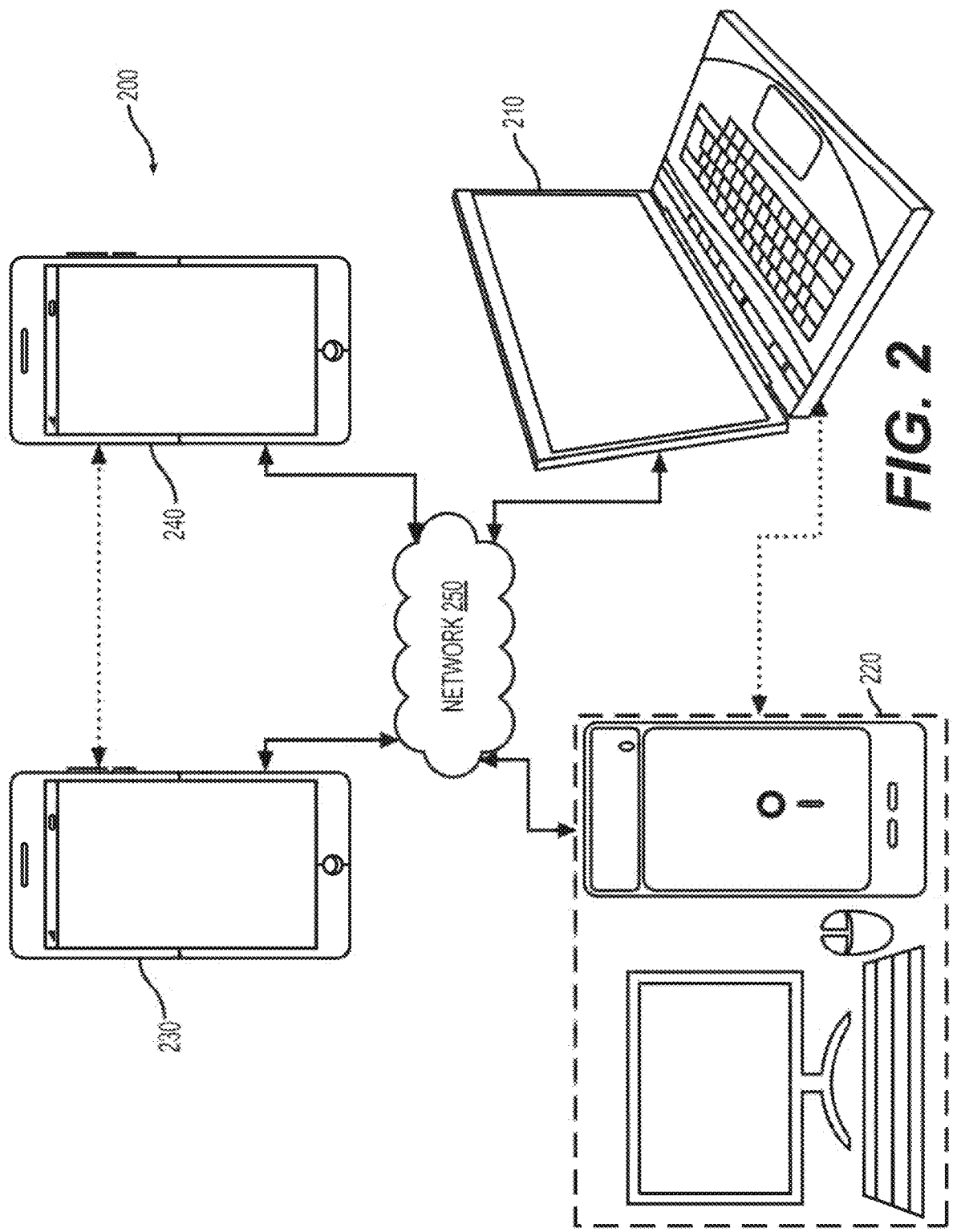
FIG. 2 shows a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240)

that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
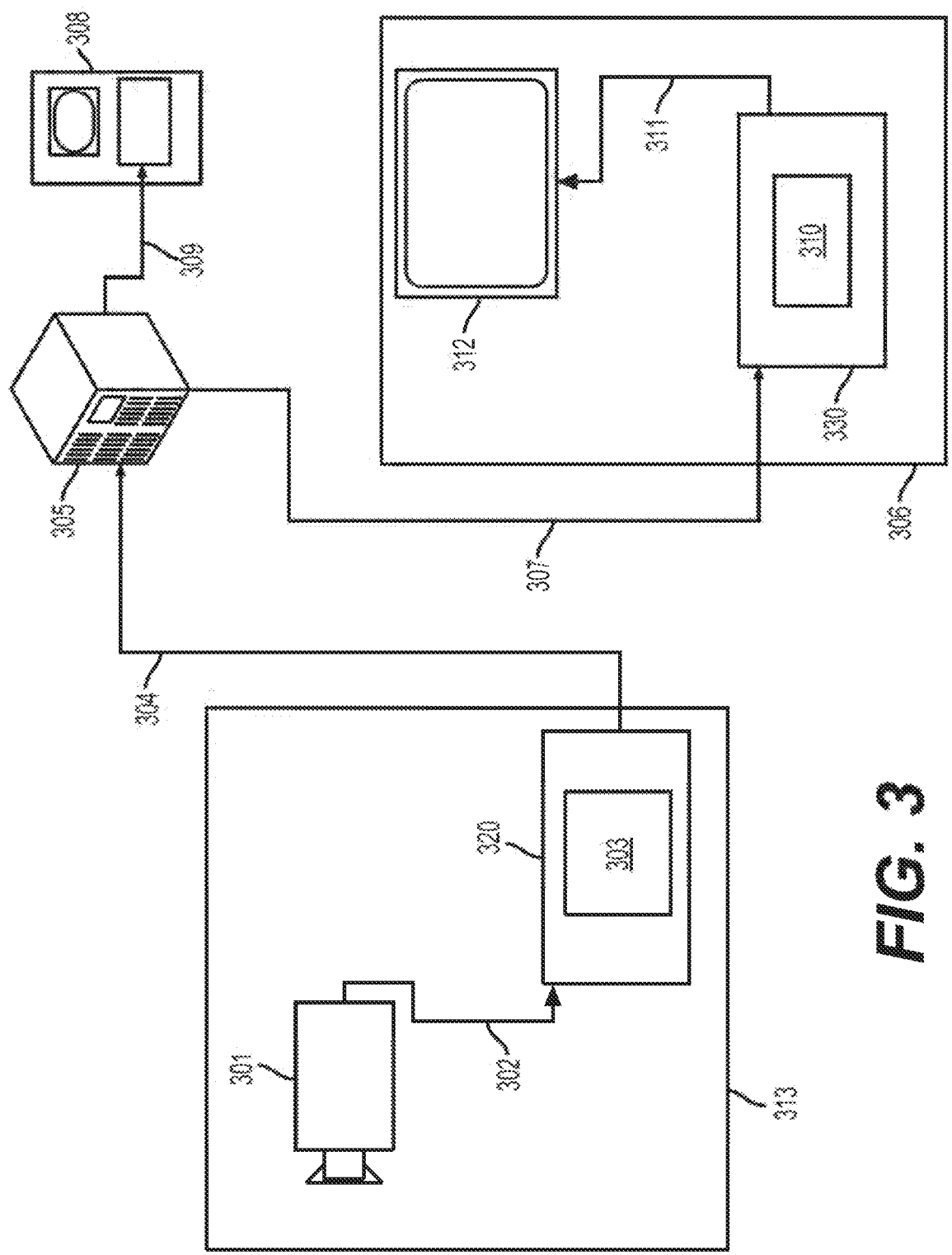
FIG. 3 shows a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
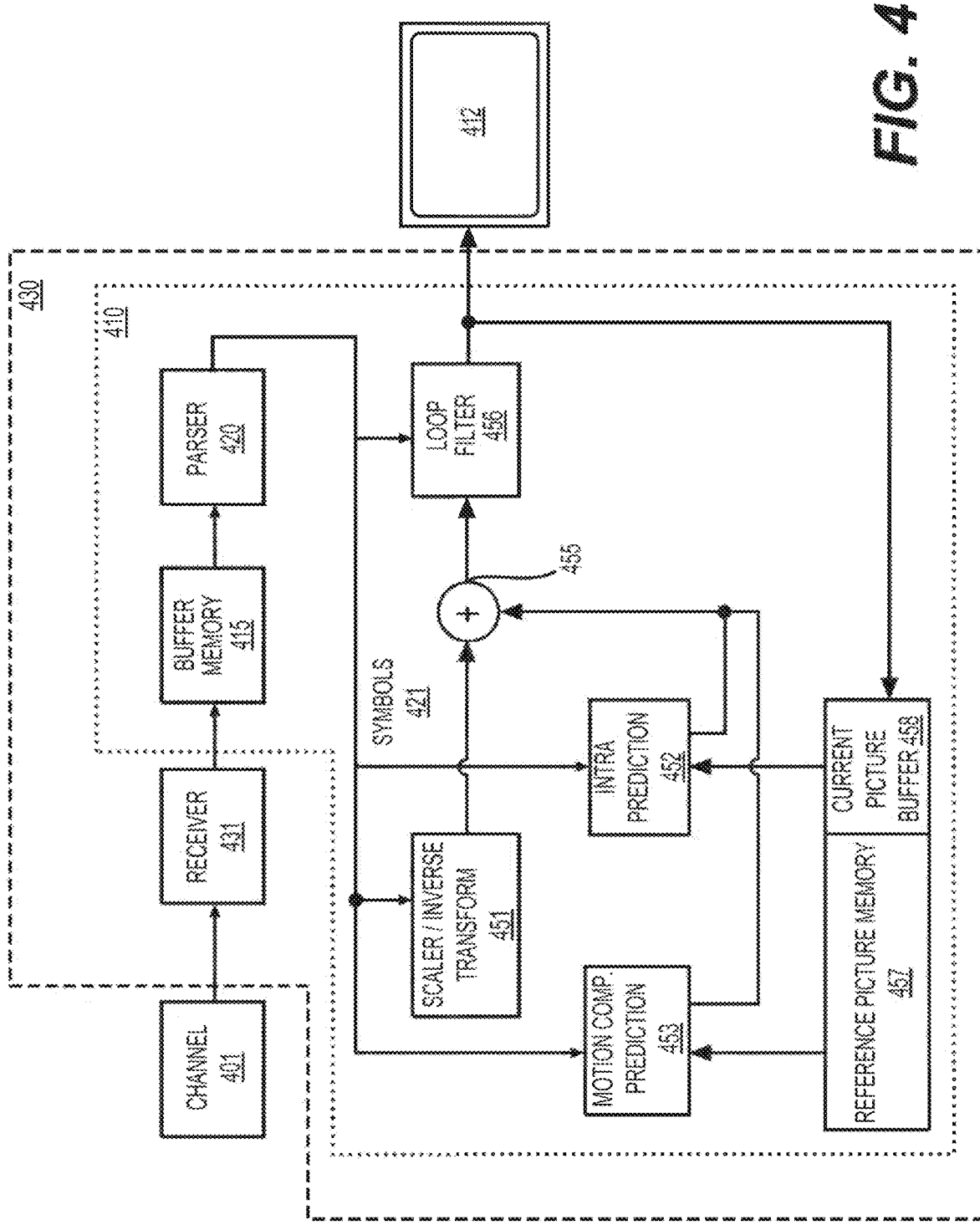
FIG. 4 shows a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example, mega samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
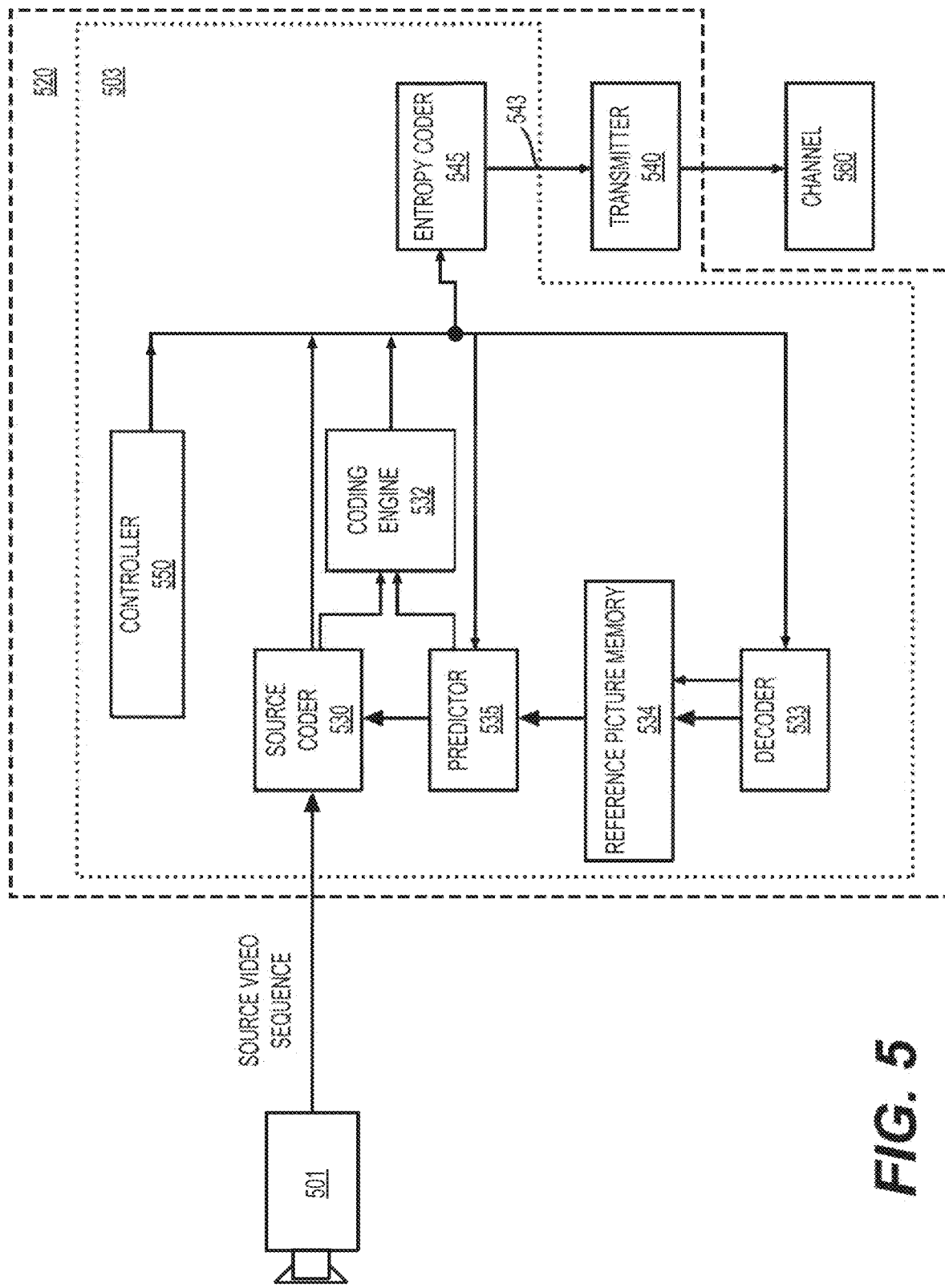
FIG. 5 shows a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector allowed reference area, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple CUs. For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
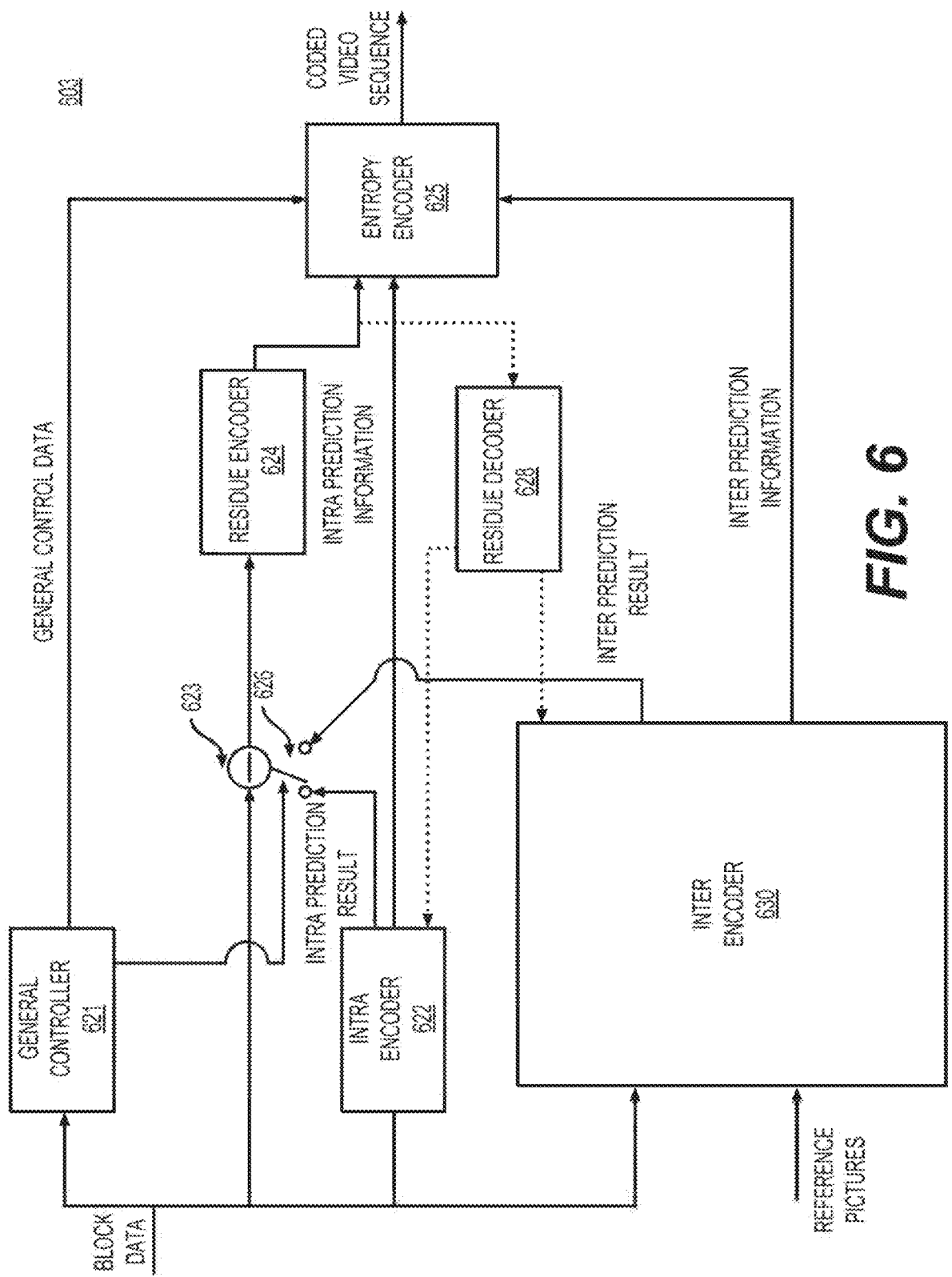
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
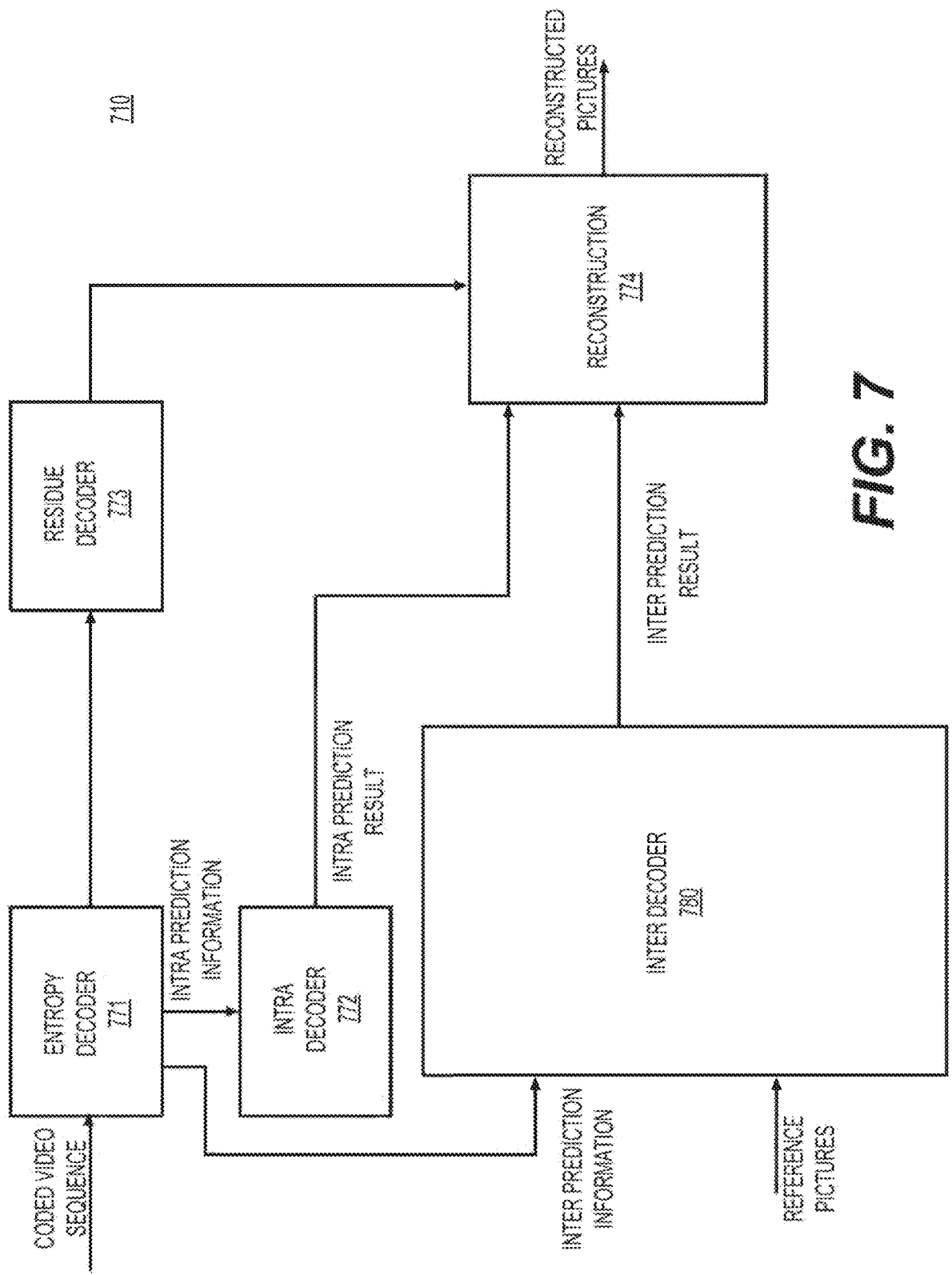
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

II. Triangle Partition Mode (TPM) for Inter Prediction

In some cases, a TPM can be supported for inter prediction. The TPM can only be applied to CUs that are 8×8 or larger. The TPM can be signaled using a CU-level flag as one kind of merge mode, with other merge modes, such as the regular merge mode, the MMVD mode, the CIIP mode, and the subblock merge mode.

Figure 8B:
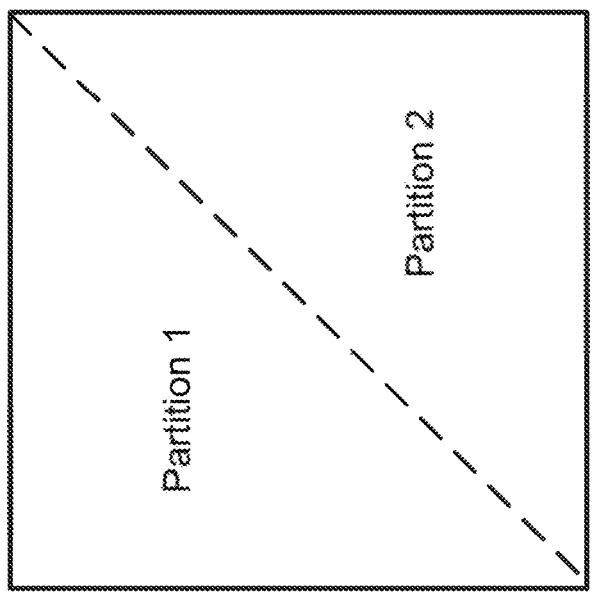
FIGS. 8A and 8B show two exemplary triangular partitions in accordance with some embodiments.
Figure 8A:
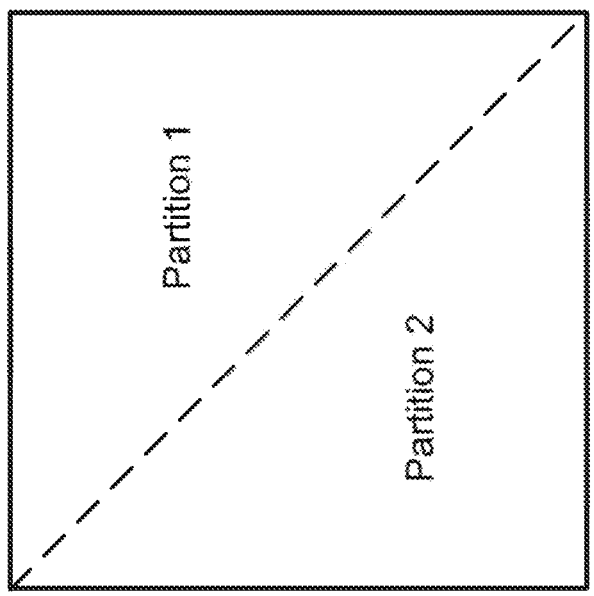

When the TPM is used, a CU can be split evenly into two triangle-shaped partitions, using either a diagonal split or an anti-diagonal split, as shown in FIGS. 8A and 8B for example. Each triangle partition in the CU can be inter-predicted using its own motion parameters. Only uni-prediction can be allowed for each partition. That is, each partition has one motion vector and one reference index. The uni-prediction motion constraint is applied to ensure that the triangle partition is the same as the conventional bi-prediction. That is, only two motion compensated predictions are needed for each CU. The uni-prediction motion for each partition can be derived using the process described in FIGS. 1A-1D.

If the TPM is used for a current CU, then a flag indicating a direction (diagonal or anti-diagonal) of the TPM and two merge indices (one for each partition) can be further signaled. The maximum TPM candidate size can be signaled explicitly at the slice level and specify syntax binarization for the TMP merge indices. After predicting each of the triangular partitions, the sample values along the diagonal or anti-diagonal edge can be adjusted using a blending process with adaptive weighting values. After deriving the prediction signal for the whole CU, transform and quantization process can be further applied to the whole CU as in other prediction modes. Finally, the motion field of the CU that is predicted using the TPM can be stored.

In some cases, the TPM cannot be used in combination with subblock transform (SBT). That is, when the signaled triangle mode is equal to 1, the cu_sbt_flag is inferred to be 0 without signaling.

II.1 Uni-Prediction Candidate List Construction

Figure 9:
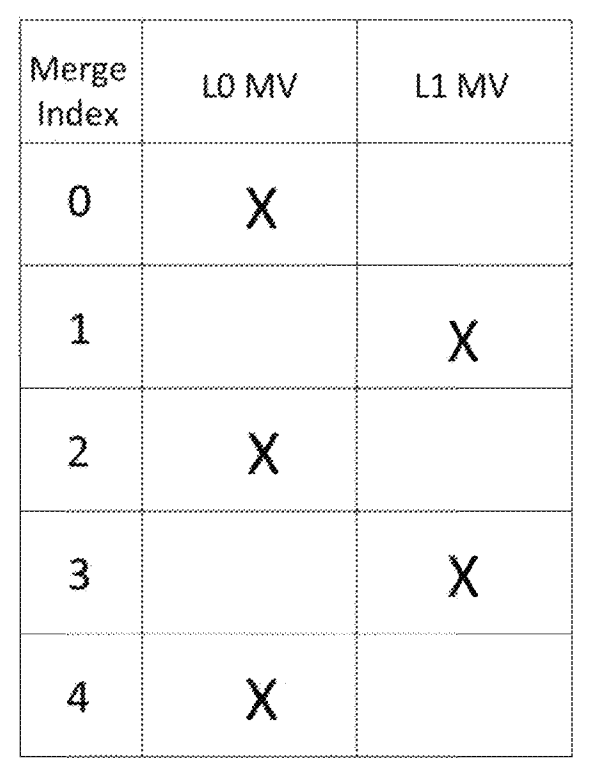

The uni-prediction candidate list can be derived directly from the merge candidate list constructed according to the extended merge prediction process. Denote N as the index of the uni-prediction motion in the triangle uni-prediction candidate list. The LX motion vector of the N-th extended merge candidate, with X equal to the parity of N, is used as the N-th uni-prediction motion vector for TPM. These motion vectors are marked with "X" in FIG. 9. In case a corresponding LX motion vector of the N-the extended merge candidate does not exist, the L(1−X) motion vector of the same candidate is used instead as the uni-prediction motion vector for TPM.

II.2 Blending Along Triangle Partition Edge

Figure 10B:
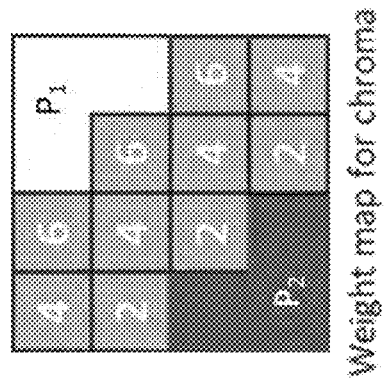
FIGS. 10A and 10B show exemplary weight maps for luma and chroma in accordance with some embodiments.
Figure 10A:
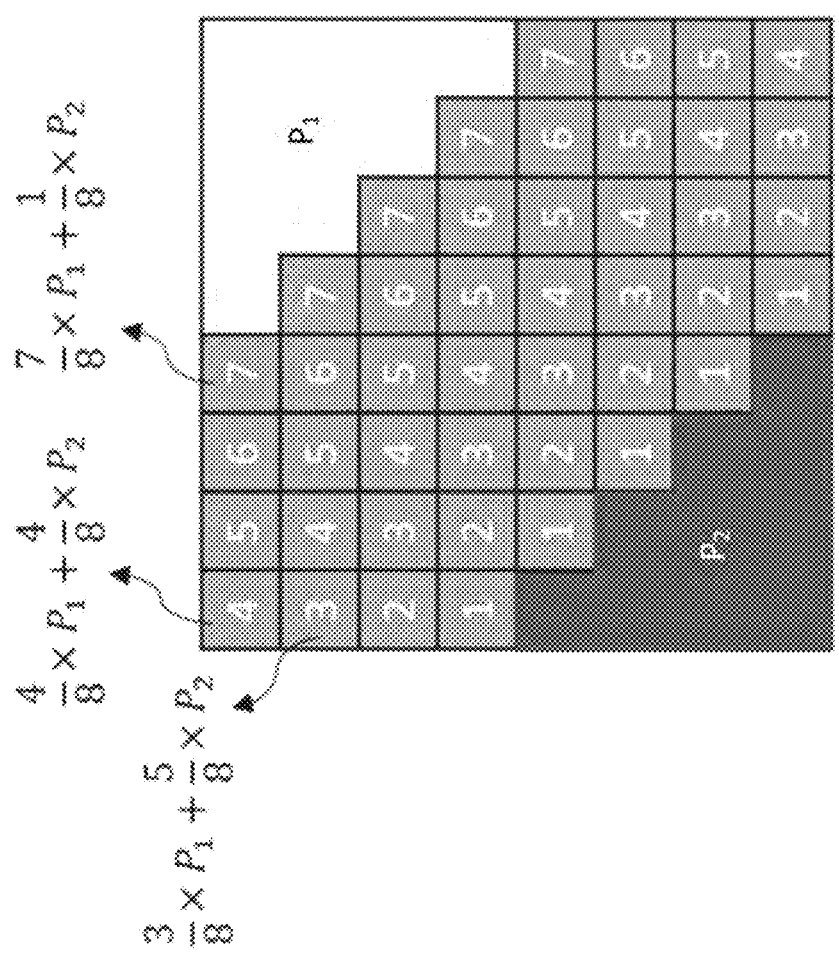

After predicting each triangular partition using its own motion parameters, the blending process can be applied to the two prediction signals to derive samples around the diagonal or anti-diagonal edge. The following weighting values are used in the blending process: {7/8, 6/8, 5/8, 4/8, 3/8, 2/8, 1/8} for luma and {6/8, 4/8, 2/8} for chroma, as shown in FIGS. 10A and 10B.

In some cases, the motion vectors of a CU coded in TPM can be generated using the following process. If Mv1 and Mv2 are from different reference picture lists (e.g., one from L0 and the other from L1), then Mv1 and Mv2 are simply combined to form the bi-prediction motion vector. Otherwise, if Mv1 and Mv2 are from the same list, only uni-prediction motion Mv2 is stored.

III. Geometric Merge Mode (GEO)

Techniques related with geometric merge mode (GEO) are described in: (i) Han Gao, Semih Esenlik, Elena Alshina, Anand Meher Kotra, Biao Wang, Max Bläser, Johannes Sauer, "CE4: CE4-1.1, CE4-1.2 and CE4-1.14: Geometric Merge Mode (GEO)", JVET-P0068, Joint Video Experts Team (JVET) of ITU-T SG 16 WP 3 and ISO/IEC JTC 1/SC 29/WG 11, 16th Meeting: Geneva, CH, 1-11 Oct. 2019; (ii) Han Gao, Semih Esenlik, Elena Alshina, Anand Meher Kotra, Biao Wang, Max Bläser, Johannes Sauer, "Simplified GEO without multiplication and minimum blending mask storage", JVET-P0884, Joint Video Experts Team (JVET) of ITU-T SG 16 WP 3 and ISO/IEC JTC 1/SC 29/WG 11, 16th Meeting: Geneva, CH, 1-11 Oct. 2019; (iii) Kevin Reuzél, Chun-Chi Chen2, Han Huang3, Wei-Jung Chien, Vadim Seregin, Marta Karczewicz, Ru-Ling Liao4, Jie Chen5, Yan Ye, Jiancong Luo, Max Blašer, Johannes Sauer of ITU-T SG 16 WP 3 and ISO/IEC JTC 1/SC 29/WG 11, 16th Meeting: Geneva, CH, 1-11 Oct. 2019. The documents of JVET-P0068, JVET-P0884, and JVET-P0085 are incorporated by reference herein.

Geometric merge mode (GEO), also referred to as geometric partitioning mode (GPM), can support a plurality of different partitioning manners. The partitioning manners can be defined by angles and edges. For example, 140 different partitioning manners can be differentiated by 32 angles (quantized between 0 and 360° with 11.25° of equal separation) and 5 edges relative to the center of a CU.

Figure 11:
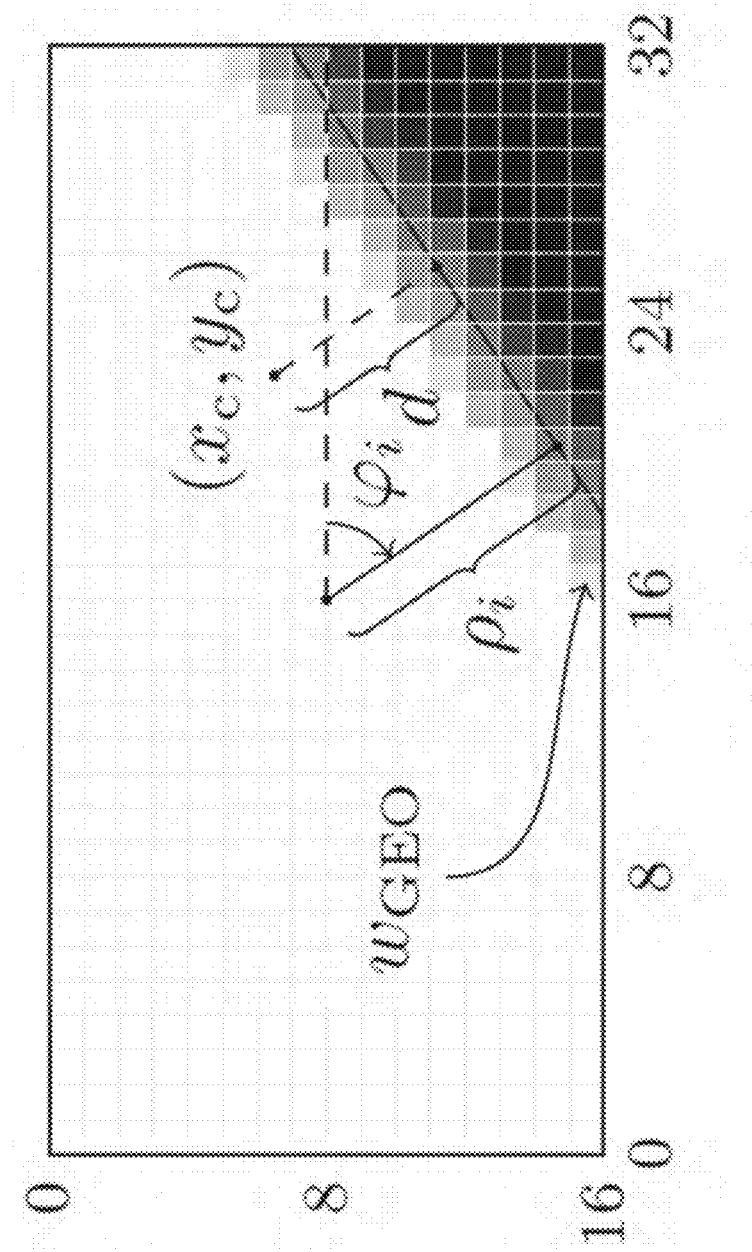
FIG. 11 shows an exemplary geometric partitioning mode according to some embodiments of the disclosure.

FIG. 11 shows an exemplary GEO. In FIG. 11, an angle $\varphi_i$ represents a quantized angle between 0 and 360 degrees and a distance offset $\rho_i$ represents a quantized offset of the largest distance $\rho_{max}$. The value of $\rho_{max}$ can be geometrically derived by Eq. 5 for either a w or h that is equal to 8 and scaled with log2 scaled short edge length. The variables h and w represent the height and width of the current block. When $\varphi$ is equal to 0°, $\rho_{max}$ is equal to w/2. When $\varphi$ is equal to 90°, $\rho_{max}$ is equal to h/2. In Eq. 5, $\rho_{margin}=1.0$ is to prevent the split boundary from being too close to the corner of the current block.

$$\rho_{max}(\varphi, w, h) = \cos(\varphi)\left(\frac{h}{2\tan\left(\frac{\pi}{2}-\varphi\right)} + \frac{w}{2}\right) - \rho_{margin}, \quad \text{(Eq. 5)}$$

$$0 < \varphi < \frac{\pi}{2}$$

Each partition mode (i.e., a pair of an angle index and an edge index) in GEO can be assigned with a pixel-adaptive weight table to blend samples in the two partitioned parts. The weighting value of a sample can range from for example 0 to 8 and be determined by the L2 distance from the center position of a pixel to the edge. A unit-gain constraint can be followed when the weighting values are assigned. For example, when a small weighting value is assigned to a GEO partition, a large complementary one is assigned to the other partition, summing up to 8.

IV. Weighted Sample Prediction Process for GEO
IV.1 Blending Weight Calculation

In GEO, a final sample predictor $P_B$ can be derived with two 3-bit blending masks (i.e., weighting values or weighting factors) $W_0$ and $W_1$ and two predictors $P_0$ and $P_1$ according to Eq. 6.

$$P_B = (W_0 P_0 + W_1 P_1 + 4) >> 3 \quad \text{(Eq. 6)}$$

The blending masks $W_0$ and $W_1$ can be derived from a look-up table based on their weighting indices. A blending weight index (also referred to as a blending weight in some contexts) can be derived based on a distance between the sample position (x, y) and the split boundary, as shown in Eq. 7.

$$wIdx(x, y) = x \times \cos(\varphi) + y \times \cos\left(\varphi + \frac{\pi}{2}\right) - \quad \text{(Eq. 7)}$$
$$\left(\rho + \frac{w}{2} \times \cos(\varphi) + \frac{h}{2} \times \cos\left(\varphi + \frac{\pi}{2}\right)\right)$$

where $$\rho = i \times \frac{\rho_{max}(\varphi, w, h)}{n} \quad \text{(Eq. 8)}$$

$$= i \times \left(\left(\frac{h}{2} \times \tan(\varphi) + \frac{w}{2}\right) \times \cos(\varphi) - \rho_{margin}\right)/n \quad \text{(Eq. 9)}$$

$$= i \times \left(\left(\frac{w}{2} \times \cos(\varphi) + \frac{h}{2} \times \cos\left(\varphi + \frac{\pi}{2}\right)\right) - \rho_{margin}\right)/n \quad \text{(Eq. 10)}$$

In Eq. 10, n represents the total distance quantization steps, and i represents the distance step index for the GEO with the angle $\varphi$, and i<n.

Finally, the blending masks $W_0$ and $W_1$ (or the weighting values) of the sample can be set using Table 3 denoted as GeoFilter, as shown in Eq. 11.

$$\text{weight}(x,y) = wIdx(x,y) \leq 0 ? \text{GeoFilter}[[wIdx(x,y)]]:8- \text{GeoFilter}[[wIdx(x,y)]] \quad \text{(Eq. 11)}$$

An exemplary weighted sample prediction process is described as follows. Inputs to this process include two variables nCbW and nCbH specifying the width and the height of the current coding block, two (nCbW)×(nCbH) arrays predSamplesLA and predSamplesLB, a variable angleIdx specifying the angle index of the geometric partition, a variable distanceIdx specifying the distance idx of the geometric partition, and a variable cIdx specifying a color component index. Outputs of this process include a (nCbW)×(nCbH) array pbSamples of prediction sample values and a (nCbW>>2)×(nCbH>>2) array motionIdx.

The variable bitDepth can be derived as follows: if cIdx=0, bitDepth=BitDepthY; otherwise, bitDepth=BitDepthC.

The variables shift1=Max(5, 17-bitDepth) and offset1=1<<(shift1-1).

The weights array sampleWeightL[x][y] for luma and sampleWeightC[x][y] for chroma with x=0 ... nCbW−1 and y=0 ... nCbH−1 can be derived as follows:

The variables wIdx=log 2(nCbW) and hIdx=log 2(nCbH).

The variable whRatio=(wIdx>=hIdx)?wIdx-hIdx:hIdx-wIdx, scaleIdx=(wIdx>=hIdx)?hIdx-3:wIdx-3.

The variables displacementX=angleIdx and displacementY=(displacementX+8) % 32.

The variable angleN=(wIdx>=hIdx)?(angleIdx>>3& 1)?angleIdx % 8:8-angleIdx % 8:(angleIdx>>3&1)?8-angleIdx % 8:angleIdx % 8.

The variable rho can be set to the following value using the look-up tables denoted as stepDis and Dis, specified in Table 1 and Table 2.

rho=distanceIdx*(stepDis[whRatio][angleN]<<scaleIdx)+(Dis[displacementX]<<wIdx)+(Dis[displacementY]<<hIdx).

The variable weightIdx and weightIdxAbs can be calculated using the look-up Table 2 with x=0 ... nCbW−1 and y=0 ... nCbH−1.

weightIdx=((x<<1)+1)*Dis[displacementX]+ ((y<<1)+1))*Dis[displacementY]-rho.

weightIdxAbs=Clip3(0, 26,(abs(weightIdx)+4)>>3).

The variable partIdx can be set to weightIdx>0, if x=0 and y=nCbH−1.

The value of sampleWeightL[x][y] with x=0 ... nCbW−1 and y=0 ... nCbH−1 can be set according to Table 3 denoted as GeoFilter.

sampleWeightL[x][y]=weightIdx<=0?GeoFilter [weightIdxAbs]:8-GeoFilter[weightIdxAbs].

The value sampleWeightC[x][y] with x=0 ... nCbW−1 and y=0 ... nCbH−1 can be set as follows: sampleWeightC [x][y]=sampleWeightL[(x<<(SubWidthC−1))][(y<<(SubHeightC−1))].

TABLE 1

| whRatio | 0 | 0 | 0 | 0 | 0 | 0 | 0 | 0 | 0 | 1 | 1 | 1 | 1 | 1 | 1 | 1 | 1 | 1 |
|---|---|---|---|---|---|---|---|---|---|---|---|---|---|---|---|---|---|---|
| angleN | 0 | 1 | 2 | 3 | 4 | 5 | 6 | 7 | 8 | 0 | 1 | 2 | 3 | 4 | 5 | 6 | 7 | 8 |
| stepDis [whRatio] [angleN] | 77 | 95 | 108 | 116 | 119 | 116 | 108 | 95 | 77 | 77 | 115 | 147 | 173 | 192 | 202 | 203 | 195 | 179 |

TABLE 1-continued

| whRatio | 2 | 2 | 2 | 2 | 2 | 2 | 2 | 2 | 2 | 3 | 3 | 3 | 3 | 3 | 3 | 3 | 3 | 3 |
|---|---|---|---|---|---|---|---|---|---|---|---|---|---|---|---|---|---|---|
| angleN | 0 | 1 | 2 | 3 | 4 | 5 | 6 | 7 | 8 | 0 | 1 | 2 | 3 | 4 | 5 | 6 | 7 | 8 |
| stepDis [whRatio] [angleN] | 77 | 155 | 226 | 287 | 336 | 372 | 392 | 396 | 384 | 77 | 235 | 382 | 515 | 626 | 712 | 770 | 798 | 794 |

TABLE 2

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Dis[idx] | 64 | 63 | 59 | 53 | 45 | 36 | 24 | 12 | 0 | −12 | −24 | −36 | −45 | −53 | −59 | −63 |
| idx | 16 | 17 | 18 | 19 | 20 | 21 | 22 | 23 | 24 | 25 | 26 | 27 | 28 | 29 | 30 | 31 |
| Dis[idx] | −64 | −63 | −59 | −53 | −45 | −36 | −24 | −12 | 0 | 12 | 24 | 36 | 45 | 53 | 59 | 63 |

TABLE 3

| idx | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Geo-Filter[idx] | 4 | 4 | 4 | 4 | 5 | 5 | 5 | 5 | 5 | 5 | 6 | 6 | 6 | 6 |
| idx | 14 | 15 | 16 | 17 | 18 | 19 | 20 | 21 | 22 | 23 | 24 | 25 | 26 | |
| Geo-Filter[idx] | 6 | 6 | 6 | 6 | 7 | 7 | 7 | 7 | 7 | 7 | 7 | 7 | 8 | |

IV.2 Minimum Blending Weight Mask Storage

In order to reduce the storage requirement of the pre-calculated blending masks, a minimum blending mask storage method can achieve an 84-91% memory requirement reduction for the blending weights storage.

Let g_sampleWeight$_L$[ ] represent the pre-defined masks for blending weights. Assuming that N represents the number of pre-defined masks in each set, and N is set to NA>>1, where NA is the number of angles supported in GEO. M×M represents the size of the pre-defined masks for the blending weights, and M is set to 128+((ND−1)×(128>>S))<<1, where ND is the number of steps supported in GEO and S is set to ND−1. For the 32 angles with 5 steps setting, N is set to 16 and M is set to 192. For the 24 angles with 4 steps setting, N is set to 12 and M is set to 224.

For a block of size W×H with geometric partitioning index K, the blending weights for luma samples are derived as follows. Variables angle φ and distance ρ are obtained from a look-up table using the geometric partitioning index K. Variables offsetX and offsetY can be calculated as follows:

$$offsetX = \begin{cases} (M - W) \gg 1, \varphi \% N = 8 \text{ or } (\varphi \% N \neq 0 \text{ and } H \geq W) \\ ((M - W) \gg 1) + \varphi < N \text{ ? } (\rho \times W) \gg S : -((\rho \times W) \gg S), \text{otherwise} \end{cases}$$ (Eq. 12)

$$offsetY = \begin{cases} ((M - H) \gg 1) + \varphi < N \text{ ? } (\rho \times H) \gg S : -((\rho \times H) \gg S), \\ \varphi \% N = 8 \text{ or } (\varphi \% N \neq 0 \text{ and } H \geq W) \\ (M - H) \gg 1, \text{otherwise} \end{cases}$$ (Eq. 13)

$$sampleWeight_L[x][y] = g\_sampleWeight_L[\varphi \% N][x + offsetX][y + offsetY]$$ (Eq. 14)

An exemplary weighted sample prediction process with minimum blending weight mask storage for GEO is described as follows. Inputs to this process include two variables nCbW and nCbH specifying the width and the height of the current coding block, two (nCbW)×(nCbH) arrays predSamplesLA and predSamplesLB, a variable angleIdx specifying the angle index of the geometric partition, a variable distanceIdx specifying the distance idx of the geometric partition, and a variable cIdx specifying a color component index. Outputs of this process include a (nCbW)×(nCbH) array pbSamples of prediction sample values and a variable partIdx.

The variable bitDepth can be derived as follows: if cIdx=0, bitDepth=BitDepthY; otherwise, bitDepth=BitDepthC.

The variables shift1=Max(5, 17−bitDepth) and offset1=1<<(shift1−1).

The weights array sampleWeightL[x][y] for luma and sampleWeightC[x][y] for chroma with x=0 . . . nCbW−1 and y=0 . . . nCbH−1 can be derived as follows:

The variable hwRatio=nCbH/nCbW.

The variables displacementX=angleIdx and displacementY=(displacementX+8)% 32.

The variable partIdx=(angleIdx>=13&& angleIdx<=27)? 1:0.

The variable rho can be set to the following value using the look-up Table 2.

$$rho=(Dis[displacementX]<<8)+(Dis[displacementY]<<8).$$

If one of the following conditions is true, the variable shiftHor=0: (1) angleIdx %16=8; and (2) angleIdx %16!=0 and hwRatio≥1. Otherwise, shiftHor=1.

If shiftHor=0, offsetX=(256−nCbW)>>1, offsetY=(256−nCbH)>>1+angleIdx<16?(distanceIdx*nCbH)>>3:−((distanceIdx*nCbH)>>3).

Otherwise, if shiftHor=1, offsetX=(256−nCbW)>>1+angleIdx<16?(distanceIdx*nCbW)>>3:−((distanceIdx*nCbW)>>3), offsetY=(256−nCbH)>>1.

The variable weightIdx and weightIdxAbs can be calculated using the look-up Table 2 with x=0 . . . nCbW−1 and y=0 . . . nCbH−1 as follows:

weight$Idx$=(((x+offsetX)<<1)+1)*Dis[displacementX]+(((y+offsetY)<<1)+1))*Dis[displacementY]−rho,weight$Idx$Abs=Clip3(0,26,abs(weightIdx)).

The value of sampleWeightL[x][y] with x=0 . . . nCbW−1 and y=0 . . . nCbH−1 can be set according to Table 3 denoted as GeoFilter.

sampleWeight$L$[x][y]=weight$Idx$<=0?GeoFilter[weight$Idx$Abs]:8−GeoFilter[weight$Idx$Abs].

The value sampleWeightC[x][y] with x=0 . . . nCbW−1 and y=0 . . . nCbH−1 can be set as follows: sampleWeightC[x][y]=sampleWeightL[(x<<(SubWidthC−1))][(y<<(SubHeightC−1))].

V. Motion Vector Storing Process for GEO

V.1 TPM-Like Motion Vector Derivation

In some cases, luminance sample weights at four corners of a 4×4 motion storage unit can be summed up. The sum can be compared with two thresholds to determine whether one of two uni-prediction motion information and bi-prediction motion information is stored. The bi-prediction motion information can be derived using the same process as TPM.

An exemplary motion vector storage process for GEO is described as follows.

The array motionIdx[xSbIdx][ySbIdx] with xSbIdx=0 . . . (nCbW>>2)−1 and ySbIdx=0 . . . (nCbH>>2)−1 can be derived as follows:

The variables threshScaler=(wIdx+hIdx)>>1)−1, threshLower=32>>threshScaler, threshUpper=32−threshLower, Cnt=sampleWeightL[(xSbIdx<<2)][(ySbIdx<<2)]+sampleWeightL[(xSbIdx<<2)+3][(ySbIdx<<2)]+sampleWeightL[(xSbIdx<<2)][(ySbIdx<<2)+3]+sampleWeightL[(xSbIdx<<2)+3][(ySbIdx<<2)+3], Cnt=partIdx?32−Cnt:Cnt, motionIdx[xSbIdx][ySbIdx]=Cnt<=threshLower?0:Cnt>=threshUpper?1:2.

If the merge_geo_flag[xCb][yCb]=1, sType=motionIdx[xSbIdx][ySbIdx] with xSbIdx=0 . . . numSbX−1, and ySbIdx=0 . . . numSbY−1.

V.2 Simplified Motion Vector Storage Process

In some cases, the motion vector storage process is further simplified. The distance between the central position of a 4×4 motion storage unit and the split boundary can be calculated and compared with a fixed threshold to determine whether uni- or bi-prediction motion information is stored for the 4×4 motion storage unit. The sign of the distance indicates which uni-prediction motion information should be stored in the uni-prediction storage case. The dependency of blending mask and motion storage can be removed.

If the merge_geo_flag[xCb][yCb]=1, wIdx=log 2(cbWidth), hIdx=log 2(cbHeight), whRatio=(wIdx>=hIdx)?wIdx−hIdx:hIdx−wIdx, scaleIdx=(wIdx>=hIdx)?hIdx−3:wIdx−3, displacementX=angleIdx, displacementY=(displacementX+8)%32, angleN=(wIdx>=hIdx)?(angleIdx>>3&1)?angleIdx % 8:8−angleIdx %8:(angleIdx>>3& 1)?8−angleIdx %8:angleIdx %8.

The variable rho is set to the following value using the look-up tables denoted as stepDis and Dis, specified in Table 1 and Table 2.

rho=distance$Idx$*(stepDis[w$h$Ratio][angle$N$]<<sca-le$Idx$)+(Dis[displacementX]<<wIdx)+(Dis[displacementY]<<hIdx).

The variable motionOffset is set to the following value using the look-up tables denoted as Dis, specified in Table 1 and Table 2.

motionOffset=3*Dis[displacementX]+3*Dis[displacementY].

The variable motionIdx is calculated using the look-up Table 2 as follows:

motionIdx=((xSbIdx<<3)+1)*Dis[displacementX]+((xSbIdx<<3)+1))*Dis[displacementY]−rho+motionOffset.

The variable sType is derived as follows: if partIdx=1, sType=abs(motionIdx)<256?2:motionIdx<=0?1:0; otherwise, sType=abs(motionIdx)<256?2:motionIdx<=0?0:1.

V.3 Minimum Motion Vector Storage Process

To reduce the memory needed for storing the masks for motion field storage, in a process, all the information from a pre-defined mask can be derived for the masks of motion field storage. This process is invoked when decoding a coding unit with MergeWedgeFlag[xCb][yCb]=1. Inputs to this process include a luma location (xCb, yCb) specifying the top-left sample of the current coding block relative to the top left luma sample of the current picture, a variable cbWidth specifying the width of the current coding block in luma samples, a variable cbHeight specifying the height of the current coding block in luma samples, the luma motion vectors in 1/16 fractional-sample accuracy mvA and mvB, the reference indices refIdxA and refIdxB, and the prediction list flags predListFlagA and predListFlagB.

The variables numSbX and numSbY specifying the number of 4×4 blocks in the current coding block in horizontal and vertical direction are set equal to numSbX=cbWidth>>2 and numSbY=cbHeight>>2.

The variables displacementX=angleIdx, displacementY=(displacementX+8)%32, hwRatio=nCbH/nCbW.

If one of the following conditions is true, the variable shiftHor=0: (1) angleIdx %16=8; and (2) angleIdx %16!=0 and hwRatio≥1. Otherwise, shiftHor=1.

The variable partIdx=(angleIdx>=13&&angleIdx<=27)?1:0.

If shiftHor=0, offsetX=(64−numSbX)>>1, offsetY=(64−numSbY)>>1+angleIdx<16?(distanceIdx*nCbH)>>5:−((distanceIdx*nCbH)>>5). Otherwise, if shiftHor=1, offsetX=(64−numSbX)>>1+angleIdx<16?(distanceIdx*nCbW)>>5:−((distanceIdx*nCbW)>>5), offsetY=(64—numSbY)>>1.

The value of the variable rho is derived according to the equation below and the Dis lookup table specified in Table 2. rho=(Dis[displacementX]<<8)+(Dis[displacementY]<<8).

The variable motionOffset is set equal to the following value using the look-up tables denoted as Dis, specified in Table 1 and Table 2.

motionOffset=3*Dis[displacementX]+3*Dis[displacementY]

For each 4×4 subblock at subblock index (xSbIdx, ySbIdx) with xSbIdx=0 . . . numSbX−1, and ySbIdx=0 . . . numSbY−1, the variable motionIdx is calculated using the look-up Table 2 as follows:

motionIdx=(((xSbIdx+offsetX)<<3)+1)*Dis[displacementX]+(((xSbIdx+offsetY<<3)+1))*Dis[displacementY]−rho+motionOffset.

VI. Blending Process and Motion Field Storage

In GEO as described in Sections III, IV, and V, the weighted sample prediction process and motion field storage determination are computationally expensive. In some examples (e.g., as described in Section IV.1 and V.1), if the blending weights and the stored motion vector type are calculated on-the-fly, the number of multiplications, shifts, and additions for a block of size W×H samples can be as follows:

Multiplication: 3+2×W×H+0×(W×H/16)

Shift: 6+3×W×H+8×(W×H/16)

Addition: 10+6×W×H+7×(W×H/16)

For example, for an 8×8 block, 2.04 multiplications, 3.09 shifts and 6.16 additions are required per sample. In addition, three look-up tables are used for the on-the-fly calculations in some examples. The ρ in Eq. 8 is a complicated function with floating-point operations, and is realized by using a look-up table. Other two look-up tables are a cos[.] value lookup table and a transform table for converting a blending weight index to a blending weight value. Therefore, it is computationally demanding to calculate blending weight masks and motion vector type masks for each GEO coded blocks on-the-fly.

In order to reduce the computational complexity, the blending weight masks and the motion vector storage type masks can be calculated and stored in a memory in advance in some examples. However, the huge memory storage size is a design challenge. Taking the 140-mode variation of GEO as an example, the memory needed to store that information can be calculated as follows:

For blending weights: (8×8+8×16+8×32+8×64+16×8+ 16×16+16×32+16×64+32×8+32×16+32×32+32×64+ 64×8+64×16+64×32+64×64+64×128+128×64+128× 128)×140×4=26,414,080 bits=3,301,760 bytes≅3.3 Mbytes For motion field storage: (2×2+2×4+2×8+2×16+4×2+4× 4+4×8+4×16+8×2+8×4+8×8+8×16+16×2+16×4+16× 8+16×16+16×32+32×16+32×32)×140×2=825,440 bits=103,180 bytes≅103 Kbytes Based on the above calculation, memory storage requirement for three variations of GEO is listed in the Table 4:

TABLE 4

|  | 140 partitioning modes | 108 partitioning modes | 80 partitioning modes |
| --- | --- | --- | --- |
| blending weights | 3,301,760 bytes | 2,547,072 bytes | 1,886,720 bytes |
| motion storage | 103,180 bytes | 79,596 bytes | 58,960 bytes |
| Overall | 3,404,940 bytes | 2,626,668 bytes | 1,945,680 bytes |
|  | ≈3.4 Mbytes | ≈2.6 Mbytes | ≈1.9 Mbytes |

Due to the large number of partitioning modes, it may be difficult to store all the adaptive weights and the motion vector type masks for motion field storage for each block size and partitioning mode in practical implementations. In order to reduce the memory needed for storing the adaptive weights and the motion vector type masks for motion field storage, two sets of pre-defined masks, one for the blending weights derivation and the other for the masks of motion field storage, can be employed using the techniques described in Sections IV.2 and V.3. The memory needed for the blending weights and the mask for motion field storage can be reduced. But the amount of required memory is still large for practical implementations. Assume N is set to $N_A \gg 1$, where $N_A$ is the number of angles supported in GEO, and M is set to $128+((N_D-1)\times(128 \gg S)) \ll 1$, where $N_D$ is the number of steps supported in GEO mode, and S is set to $N_D-1$. The number of bits needed to store the pre-defined masks are listed as follows:

For blending weights:(M×M)×N×4

For motion field storage:(M×M)/16×N×2

Memory storage requirement for three variations of GEO is listed in the Table 5 below:

TABLE 5

|  | 140 partitioning modes | 108 partitioning modes | 80 partitioning modes |
| --- | --- | --- | --- |
| blending weights | 294,912 bytes | 401,408 bytes | 301,056 bytes |
| motion storage | 9,216 bytes | 12,544 bytes | 9,408 bytes |
| Overall | 304,128 bytes | 413,952 bytes | 310,464 bytes |
| Previous design | 3,404,940 bytes | 2,626,668 bytes | 1,945,680 bytes |
| % of reduction | 91% | 84% | 84% |

Embodiments to further simplify the weighted blending process and the motion field storage process in GEO are described below. The techniques in these embodiments enable on-the-fly weighting factor calculation and motion vector storage type determination with a small look-up table of trigonometric values (e.g., cosine values).

As described, the blending weight masks of the geometric merge mode can be derived from the distance of the sample position and the split boundary using look-up tables with Eq. 7 and Eq. 9 that are reproduced below.

$$wIdx(x, y) = x \times \cos(\varphi) + y \times \cos\left(\varphi + \frac{\pi}{2}\right) - \left(\rho + \frac{w}{2} \times \cos(\varphi) + \frac{h}{2} \times \cos\left(\varphi + \frac{\pi}{2}\right)\right) \text{ where}$$ (Eq. 7)

$$\rho = i \times \frac{\left(\frac{h}{2} \times \tan(\varphi) + \frac{w}{2}\right) \times \cos(\varphi) - \rho_{margin}}{n}, \text{ where}$$ (Eq. 9)

$$0 \leq \varphi < \frac{\pi}{2}$$

In Eq. 7, the φ represents the angle value corresponding to the partition edge and the ρ is the distance between the center of the current coding block and the split boundary. In Eq. 9, the n represents the total number of distance quantization steps, and the i represents the distance step index for the GEO partition with the angle φ. The shifted back $\rho_{margin}$ value in Eq. 9 is to avoid that the split boundary is too close to the corner of the current coding block. As an example, the typical value of $\rho_{margin}$ for the 8×8 block can be 1.0 in some examples.

Block and Angel Dependent $\rho_{Margin}$

In an embodiment, the value $\rho_{margin}$ in Eq. 9, which is used to avoid that a split boundary (a partition edge) is too close to the corner of a coding block, is not a constant. For example, the value $\rho_{margin}$ can vary depending on a block width and/or height and/or φ(the angle of the split boundary).

The value $\rho_{margin}$ can be defined to be a function of the GEO partition angle φ and the width and the height of the current coding block. For example, the $\rho_{margin}$ can be derived from the following equations:

$$\rho_{margin} = ((w \gg 3) \times (h \gg 3) \times \tan(\varphi)) \times \cos(\varphi)$$ (Eq. 15)

$$= (w \gg 3) \times \cos(\varphi) + (h \gg 3) \times \cos\left(\varphi + \frac{\pi}{2}\right)$$ (Eq. 16)

According to the Eq. 17 and Eq. 18, the distance offset $\rho$ can be simplified as shown below.

$$\rho = i \times \frac{\cos(\varphi) \times \left(\frac{w}{2} - (w \gg 3)\right) - \cos\left(\varphi + \frac{\pi}{2}\right) \times \left(\frac{h}{2} - (h \gg 3)\right)}{n} \quad \text{(Eq. 17)}$$

$$= \frac{3iw}{8n} \times \cos(\varphi) - \frac{3ih}{8n} \times \left(\varphi + \frac{\pi}{2}\right) \quad \text{(Eq. 18)}$$

Accordingly, calculation of the distance offset $\rho$ can be accomplished by shift, multiplication, and addition operations in addition to cosine value lookup table operations. The calculation has been simplified compared with using a constant $\rho_{margin}$ value.

Blending Weight Index Calculation On-the-Fly with a Single Look-Up Table

In an embodiment, only a look-up table for cosine calculation is used during the blending weight index calculation. As a result, all the weighting index calculation may be implemented on-the-fly without checking a large table for storing blending weight masks.

Based on the above Eq. 18, the blending masks of GEO derived from the distance of the sample position to the split boundary as shown in Eq. 7 can be further simplified as follows.

$$wIdx(x, y) = \left(x - \frac{w}{2}\right) \times \cos(\varphi) + \left(y - \frac{h}{2}\right) \times \cos\left(\varphi + \frac{\pi}{2}\right) - \rho \quad \text{(Eq. 19)}$$

$$= \left(x - \frac{w}{2}\right) \times \cos(\varphi) + \left(y - \frac{h}{2}\right) \times \cos\left(\varphi + \frac{\pi}{2}\right) - \quad \text{(Eq. 20)}$$

$$\left(\frac{3iw}{8n} \times \cos(\varphi) - \frac{3ih}{8n} \times \cos\left(\varphi + \frac{\pi}{2}\right)\right)$$

$$= \left(x - \frac{w \times (4n + 3i)}{8n}\right) \times \cos(\varphi) - \quad \text{(Eq. 21)}$$

$$\left(y - \frac{h \times (4n + 3i)}{8n}\right) \times \cos\left(\varphi + \frac{\pi}{2}\right)$$

If the distance step number n is a value of a power of 2, the division operations in Eq. 21 can be realized by using right shift operations as shown in Eq. 22, with or without rounding offset before the right shifts.

$$wIdx(x, y) = (x - ((w \times (4n + 3i)) \gg (3 + \log_2 n))) \times \cos(\varphi) - \quad \text{(Eq. 22)}$$

$$(y - ((h \times (4n + 3i)) \gg (3 + \log_2 n))) \times \cos\left(\varphi + \frac{\pi}{2}\right)$$

According to Eq. 22, the blending weight index for each sample can be obtained by using multipliers, adders, and one cos[.] look-up table. Also, Eq. 20 shows that only one cos[.] table is used for the blending weight index of all samples within the current CU. It also gives a hint that this cos[.] value could be accessed once and then be propagated to all samples within the current CU for the weight index calculation.

Integer-Only Calculation

In an embodiment, in order to avoid floating-point operations, components for deriving the blending weight index can be scaled up, resulting in a scaled-up value of the weight index. The scaled-up value can later be scaled back to its normal value range.

For example, each cosine value in the cos[.] lookup table can be realized as a m-bit fixed-point value, where m may be a positive value such as 6 or 3. In addition, the sample center is also adopted in digital image with discrete sampling for the blending weight index calculation. The weight index wIdx(x,y) can be scaled with a scaling factor of $2^{m+4}$ to avoid the floating-point operation and to compensate the discrete sampling situation. The Eq. 22 can thus be rewritten as Eq. 23. To keep relatively high precision, rounding offset may be applied.

$$wIdx(x, y) = \quad \text{(Eq. 23)}$$

$$\left(((x \ll 1) + 1) \ll 3) - \frac{((w \times (4n + 3i)) \ll 1)}{n}\right) \times \cos[\varphi] -$$

$$\left(((y \ll 1) + 1) \ll 3) - \frac{((h \times (4n + 3i)) \ll 1)}{n}\right) \times \cos\left[\varphi + \frac{\pi}{2}\right]$$

where $\cos[\varphi]$ and $$\cos\left[\varphi + \frac{\pi}{2}\right]$$

are implemented as a m-bit look-up table.

If the distance step number n is a value of a power of 2, the division operations in Eq. 23 can be realized by using right shift operations as shown in Eq. 24. Rounding offset may also be applied.

$$wIdx(x, y) = \quad \text{(Eq. 24)}$$

$$((((x \ll 1) + 1) \ll 3) - (((w \times (4n + 3i)) \ll 1) \gg \log_2 n)) \times$$

$$\cos[\varphi] -$$

$$((((y \ll 1) + 1) \ll 3) - (((h \times (4n + 3i)) \ll 1) \gg \log_2 n)) \times$$

$$\cos\left[\varphi + \frac{\pi}{2}\right]$$

Angels in Four Quadrants

In an embodiment, weighting index calculation may be implemented by using different formulas, depending on the quadrant of the angle $\varphi$ of split boundary. For example, for the split boundary calculation, both of the value of $\cos(\varphi)$ and $$\cos\left(\varphi + \frac{\pi}{2}\right)$$

can be positive. Accordingly, four different blending weight mask formulas can be used for the partition angle index corresponding to four different quadrants. The blending weight index equation for four different quadrants is shown below.

$$wIdx(x, y) = \qquad (Eq.\ 25)$$

$$\begin{cases} \left(x - \dfrac{w \times (4n+3i)}{8n}\right) \times \cos(\varphi) - \\ \left(y - \dfrac{h \times (4n+3i)}{8n}\right) \times \cos\left(\varphi + \dfrac{\pi}{2}\right), \text{ when } 0 \leq \varphi < \dfrac{\pi}{2} \\ \left(x - \dfrac{w \times (4n-3i)}{8n}\right) \times \cos(\varphi) - \\ \left(y - \dfrac{h \times (4n+3i)}{8n}\right) \times \cos\left(\varphi + \dfrac{\pi}{2}\right), \text{ when } \dfrac{\pi}{2} \leq \varphi < \pi \\ \left(x - \dfrac{w \times (4n-3i)}{8n}\right) \times \cos(\varphi) - \\ \left(y - \dfrac{h \times (4n-3i)}{8n}\right) \times \cos\left(\varphi + \dfrac{\pi}{2}\right), \text{ when } \pi \leq \varphi < \dfrac{3\pi}{2} \\ \left(x - \dfrac{w \times (4n+3i)}{8n}\right) \times \cos(\varphi) - \\ \left(y - \dfrac{h \times (4n-3i)}{8n}\right) \times \cos\left(\varphi + \dfrac{\pi}{2}\right), \text{ when } \dfrac{3\pi}{2} \leq \varphi < 2\pi \end{cases}$$

Row-by-Row and Column-by-Column Based Blending Weight Index Calculation

In an embodiment, the weight index wIdx(x, y) can be calculated row by row, i.e., the value of the current row, wIdx(x, y), is derived based on the value of a previous row wIdx(x, y−1). Alternatively, the weight index wIdx(x, y) can be calculated column by column, i.e., weight indices of the current column, wIdx(x, y), is derived based on weight indices of a previous column, wIdx(x−1, y).

For the sample position (x, y), the blending mask can be derived by using Eq. 26-28 based on the Eq. 23.

$$wIdx(x, y) = \qquad (Eq.\ 26)$$
$$\left(((((x-1)+1) \ll 1)+1) \ll 3) - \dfrac{((w \times (4n+3i)) \ll 1)}{n}\right) \times \cos[\varphi] -$$
$$\left((((y \ll 1)+1) \ll 3) - \dfrac{((h \times (4n+3i)) \ll 1)}{n}\right) \times \cos\left[\varphi + \dfrac{\pi}{2}\right]$$

$$= (1 \ll 4) \times \cos[\varphi] + \qquad (Eq.\ 27)$$
$$\left(((((x-1) \ll 1)+1) \ll 3) - \dfrac{((w \times (4n+3i)) \ll 1)}{n}\right) \times \cos[\varphi] -$$
$$\left((((y \ll 1)+1) \ll 3) - \dfrac{((h \times (4n+3i)) \ll 1)}{n}\right) \times \cos\left[\varphi + \dfrac{\pi}{2}\right]$$

$$(1 \ll 4) \times \cos[\varphi] + wIdx(x-1, y) \qquad (Eq.\ 28)$$

As shown in Eq. 26, the weight index wIdx(x, y) can be derived from the blending weight index of the neighboring left pixel of the previous column with a fixed offset value. The fixed offset value is cos(φ), which is a simple look-up table value with a corresponding angle index, with a scaling factor. Therefore, only one column of blending weight index values is required for mask storage. The other columns of weight indices can be determined by using the blending weight index values of the previous column with a fixed offset value.

For the sample position (x, y), the blending mask or blending weight index of this pixel sample can also be derived by using Eq. 29-31 based on the Eq. 23.

$$wIdx(x, y) = \qquad (Eq.\ 29)$$
$$\left((((x \ll 1)+1) \ll 3) - \dfrac{((w \times (4n+3i)) \ll 1)}{n}\right) \times \cos[\varphi] -$$
$$\left(((((y-1)+1) \ll 1)+1) \ll 3) - \dfrac{((h \times (4n+3i)) \ll 1)}{n}\right) \times \cos\left[\varphi + \dfrac{\pi}{2}\right]$$

$$= (1 \ll 4) \times \cos\left[\varphi + \dfrac{\pi}{2}\right] + \qquad (Eq.\ 30)$$
$$\left((((x \ll 1)+1) \ll 3) - \dfrac{((w \times (4n+3i)) \ll 1)}{n}\right) \times \cos[\varphi] -$$
$$\left(((((y-1) \ll 1)+1) \ll 3) - \dfrac{((h \times (4n+3i)) \ll 1)}{n}\right) \times \cos\left[\varphi + \dfrac{\pi}{2}\right]$$

$$= (1 \ll 4) \times \cos\left[\varphi + \dfrac{\pi}{2}\right] + wIdx(x, y-1) \qquad (Eq.\ 31)$$

In Eq. 29, the weight index wIdx(x, y) can be derived from the blending weight index of the upper neighboring pixel in the above row with a fixed offset value. The fixed offset value, $$(1 \ll 4) \times \cos\left[\varphi + \dfrac{\pi}{2}\right],$$

can be derived from a simple look-up table, cos[.], by using the given angle index with a $$\dfrac{\pi}{2}$$

phase shift. Therefore, only one row of blending weight values is required for mask storage. The other rows can be implemented by using the blending weight values of the previous row with a fixed offset value.

Independent Derivation of Weighting Indices

In an embodiment, the weigh index at position (x, y) in a coding block can be derived from a specific weight index value, wIdx(0,0) (which can be determined based on a block size, the distance offset ρ, the partition angle φ), depending on the coordinate (x, y) and a cosine table. In this way, the weighting index of each sample in the coding block can be derived independently.

From Eq. 7, the equation below can be derived:

$$wIdx(x, y) = wIdx(0, 0) + x \times \cos(\varphi) + y \times \cos\left(\varphi + \dfrac{\pi}{2}\right) \qquad (Eq.\ 32)$$

where $$wIdx(0, 0) = -\left(\rho + \dfrac{w}{2} \times \cos(\varphi) + \dfrac{h}{2} \times \cos\left(\varphi + \dfrac{\pi}{2}\right)\right) \qquad (Eq.\ 33)$$

Accordingly, after determining the value of wIdx(0,0), the weight index of each sample in a block can be calculated with the Eq. 32 in parallel.

Lookup Table Free Conversion from Weight Index to Blending Weight

In an embodiment, lookup table based weight index to final blending weight conversion is replaced by calculation based conversion. As operations of checking the lookup table has been removed, a final weighting factor of each sample may be derived in parallel.

In some examples, such as the weighted sample process of GEO described in Section VI, the value of sample weight is set according to a lookup table (e.g., the GeoFilter [ ] lookup table, Table 3). In order to remove the restriction associated with the look-up table and enable weighting derivation in parallel, a weight value of a sample can be derived on-the-fly based on a linear function of weight index. The linear function can convert a weight index to a blending weight without help of the look table.

As an example, the equation (Eq. 34) below can be employed for converting a weight index to a blending weight.

$$\text{weight}(x,y)=(2^{idx2wShiftBit+2}-wIdx(x,y))\!\gg\!idx2w\text{ShiftBit} \quad \text{(Eq. 34)}$$

For the floating-point operation based calculation (e.g., Eq. 19 and Eq. 20), no scaling up is used for calculating wIdx(x, y), and the idx2wShiftBit in Eq. 32 can be "0". The sample weight can be derived as follows.

$$\text{weight}(x,y)=4-wIdx(x,y) \quad \text{(Eq. 35)}$$

For the fixed-point operation based calculation (e.g., Eq. 19 and Eq. 20), the idx2wShiftBit in Eq. 30 can be described as in the Eq. 36.

$$idx2w\text{ShiftBit}=m+3 \quad \text{(Eq. 36)}$$

The sample weight can be derived on-the-fly by using a right shift operation as shown in Eq. 37.

$$\text{weight}(x,y)=(2^{m+5}-wIdx(x,y))\!\gg\!(m+3) \quad \text{(Eq. 37)}$$

The typical value of m can be the precision bit number of the cosine table. For example, m can be 6 or 3 in general.

Look-Up Table Free Motion Index Calculation

In an embodiment, a lookup table free calculation method can be employed for determining a motion index. For example, the motion index of a motion storage unit in a current coding block can be determined, for example, based on a coordinate of the motion storage unit $(x_{sb}, y_{sb})$, and partition distance offset ρ (represented by n and i), partition angel φ, and block size of the current coding block. As a result, motion indices motionIdx$(x_{sb}, y_{sb})$ in the current coding block may be derived at the same time independently (in parallel).

In some examples, without utilization of the TPM-like motion storage process, a motion vector storage process can be derived on-the-fly by using the distance between the central position of a motion storage unit (a subblock) and the split boundary. The motion storage unit can have a size of 4×4 samples, or other subblock sizes (e.g., 8×8 samples). The central position of a W×H subblock may be defined as an integer position at (W/2, H/2), or (W/2−1, H/2−1), or neighboring positions thereof. Alternatively, the sub-pel position ((W−1)/2.0,(H−1)/2.0) may be defined as the central position. The above distance value is compared with a fixed threshold to determine whether uni-prediction or bi-prediction motion information is stored for the motion storage unit. The sign of the distance indicates which uni-prediction motion information can be stored in uni-prediction storage case. The dependency of blending mask and motion storage can thus be removed.

In an example, a motion storage unit (subblock) has a size of 4×4 samples. The variables $x_{sb}$ and $y_{sb}$ specifying the position of the 4×4 sublock in a current w×h coding block in horizontal and vertical directions. The variables $x_{sb}$ and $y_{sb}$ satisfy the equation 0≤$x_{sb}$≤(w>>2) and 0≤$y_{sb}$<(h>>2). Using the concept of Eq. 21 and detailed derivation for discrete sampling with scaling in Eq. 19, the distance between the central position of the 4×4 motion storage unit and a split boundary can be derived in Eq. 38.

$$\text{motionIdx}(x_{sb}, y_{sb}) = \quad \text{(Eq. 38)}$$
$$\left(\left(\left(\left(x_{sb}\ll 3\right)+1\right)\ll 3\right)-\frac{((w\times(4n+3i))\ll 1)}{n}+3\right)\times\cos[\varphi]-$$
$$\left(\left(\left(\left(y_{sb}\ll 3\right)+1\right)\ll 3\right)-\frac{((h\times(4n+3i))\ll 1)}{n}+3\right)\times$$
$$\cos\left[\varphi+\frac{\pi}{2}\right]$$

If the distance step number n is a power of 2 value, division operations in Eq. 38 can be realized by using right shift operations as shown in Eq. 39. To keep relatively high precision, rounding offset may also be applied.

$$\text{motionIdx}(x_{sb}, y_{sb}) = \quad \text{(Eq. 39)}$$
$$((((x_{sb}\ll 3)+1)\ll 3)-(((w\times(4n+3i))\ll 1)\gg\log_2 n)+3)\times$$
$$\cos[\varphi]-((((y_{sb}\ll 3)+1)\ll 3)-$$
$$(((h\times(4n+3i))\ll 1)\gg\log_2 n)+3)\times\cos\left[\varphi+\frac{\pi}{2}\right]$$

Motion Index Derived from Blending Weight Index

In an embodiment, a motion index, denoted by motionIdx $(x_{sb}, y_{sb})$, of a motion storage unit (a subblock) in a coding block is derived directly from a blending weight index of a sample position within the subblock. In this way, computational cost for determining the motion index can be saved or reduced.

As described in Section V, the motion index can be derived based on the distance between the central position of a motion storage unit and a split boundary. The blending weight index can also be derived from the distance between a sample and a split boundary. Therefore, the motion index can be approximated from the blending weight index of a sample that is within the corresponding subblock, and may not be located at the center of the subblock.

In an example, the approximation can be implemented according to Eq. 40.

$$\text{motionIdx}(x_{sb}, y_{sb}) = wIdx((x_{sb}\ll 2)+i, \quad \text{(Eq. 40)}$$
$$(y_{sb}\ll 2)+j), \text{ where } \begin{cases} 0\le i<4 \\ 0\le j<4 \end{cases}$$

In Eq. 40, the motion storage unit in a motion field of a coding block is assumed to have a size of 4×4 samples. The coordinate of the sample position within the motion storage unit is represented by (i, j). For example, for a motion storage unit having a coordinate of (1, 0) in the motion field, and a sample position having a coordinate of (2, 2) in the motion storage unit being designated for calculating a motion index, a weight index at the sample position ((1<<2)+2, (0<<2)+2), that is (6, 2), in the coding block can be used as the motion index of the motion storage unit. The calculation process can be shown as follows.

$$\text{motionIdx}(1,0)=wIdx((1\!<\!<\!2)+2,(0\!<\!<\!2)+2)=wIdx(6,2) \quad \text{(Eq. 41)}$$

In various examples, the (i, j) may be equal to (1,1), (1,2), (2,1), and (2,2) corresponding to sample positions neighboring the central position (1.5, 1.5) of the corresponding subblock.

More generally, for a motion storage unit having a size of $2^n \times 2^n$ samples, the approximation can be implemented according to Eq. 42.

$$motionIdx(x_{sb}, y_{sb}) = wIdx((x_{sb} \ll n) + i,$$
$$(y_{sb} \ll n) + j), \text{ where } \begin{cases} 0 \le i < 2^n \\ 0 \le j < 2^n \end{cases} \quad (Eq.\ 42)$$

In Eq. 40-42, the blending weight index value at a sample position (x, y) within a coding block, denoted by wIdx (x, y), can be obtained in various ways in various examples. After blending weight index values have been calculated during a weighted blending process, the blending weight indices at designated positions within each motion vector storage unit can directly be used as the motion index values for determination of to-be-stored motion vector types for each motion storage unit. Compared with calculating a motion index based on a distance of a central sample position within a motion storage unit to a partition edge, computational complexity can be reduced.

VII. Example Processes of Geometric Partitioning Mode

Figure 12:
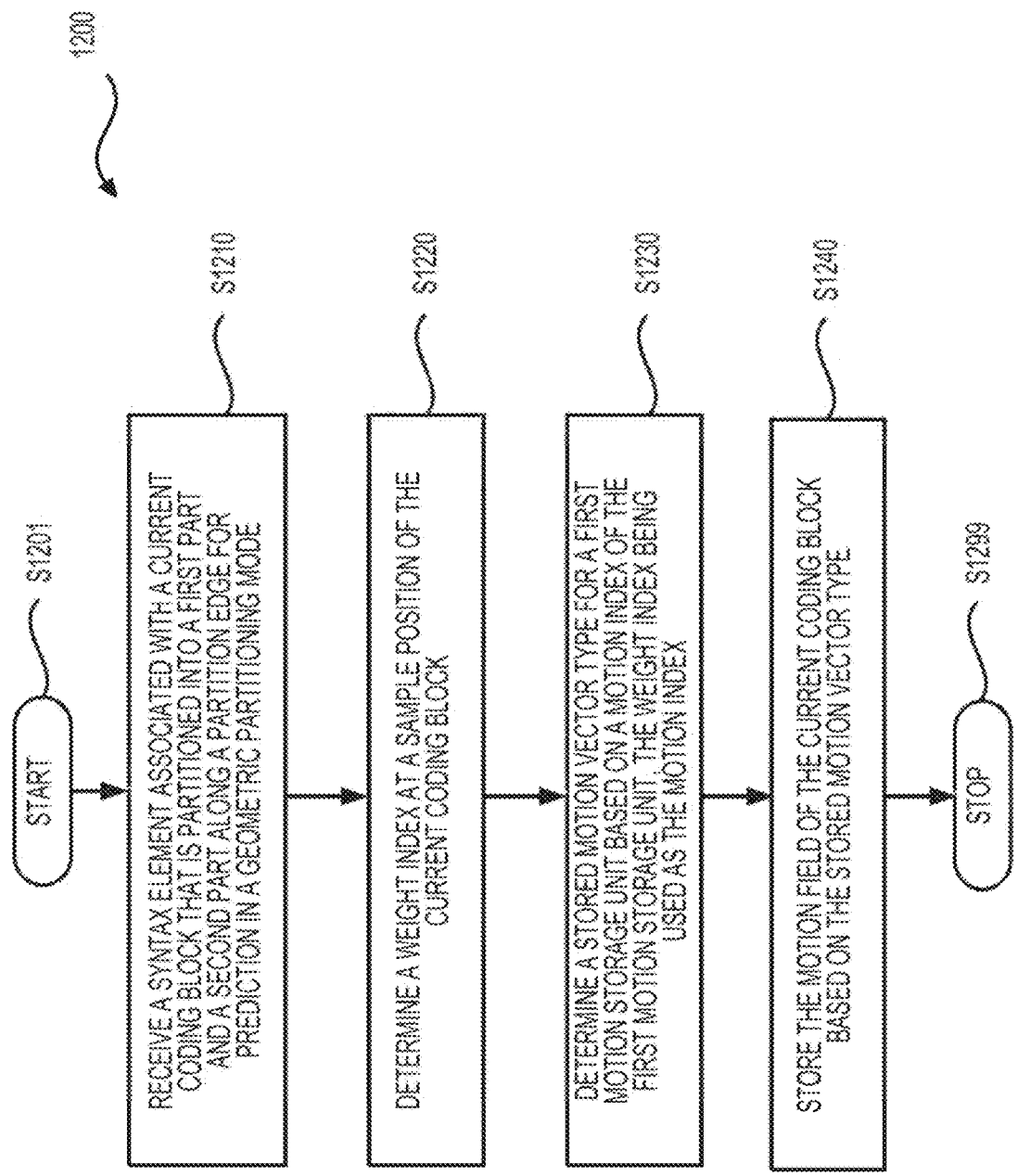
FIG. 12 shows a flow chart outlining an exemplary process in accordance with an embodiment.

FIG. 12 shows a flow chart outlining an exemplary process (1200) according to embodiments of the disclosure. In various embodiments, the process (1200) is executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1200) is implemented in software instructions, thus when the processing circuitry executes the software instructions, the processing circuitry performs the process (1200). The process (1200) can start from (S1201) and proceed to (S1210).

At (S1210), a syntax element can be received from a bitstream of a coded video. The syntax element can be associated with a current coding block that is partitioned into a first part and a second part along a partition edge for prediction in a geometric partitioning mode (GPM). For example, the following syntax elements can be signaled in the bitstream: a CU level GPM enable flag indicating the GPM is enabled for the current coding block; a GPM index indicating a partition mode (corresponding to a partition angel index and a distance offset index in a table) applied to the current coding block; and two GPM merge indices corresponding to the first part and the second part of the current coding block.

At (S1220), a weight index at a sample position of the current coding block can be determined. The weight index, for example, can correspond to a distance of the sample position to the partition edge. The weight index can subsequently be used to derive a blending weight for blending two prediction signals corresponding to the first part and the second part of the current coding block. In an example, the weight index can be converted to the blending weight using a linear function of the weight index.

At (S1230), a stored motion vector type for a first motion storage unit in a motion field of the current coding block can be determined based on a motion index of the first motion storage unit. The weight index at the sample position of the current coding block determined at (S1220) is used as the motion index of the first motion storage unit. For example, the weight index determined at (S1220) can be used to approximate a motion index at a central position of the first motion storage unit for determining the stored motion vector type. In this way, computational cost for calculating the motion index at the central position of the first motion storage unit can be saved or reduced. Decoding performance with GPM can be improved.

At (S1240), the motion field of the current coding block can be stored based on the stored motion vector type determined for the first motion storage unit in the motion field of the current coding block. For example, two motion vectors corresponding to the two GPM merge indices can be denoted by MV1 and MV2. Depending on the stored motion vector type, MV1 from the first part of the geometric partition, MV2 from the second part of the geometric partition, and a combined MV of MV1 and MV2 are stored in the motion filed for the first motion storage unit. The process (1200) can proceed to (S1299), and terminate at (S1299).

VIII. Computer System

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
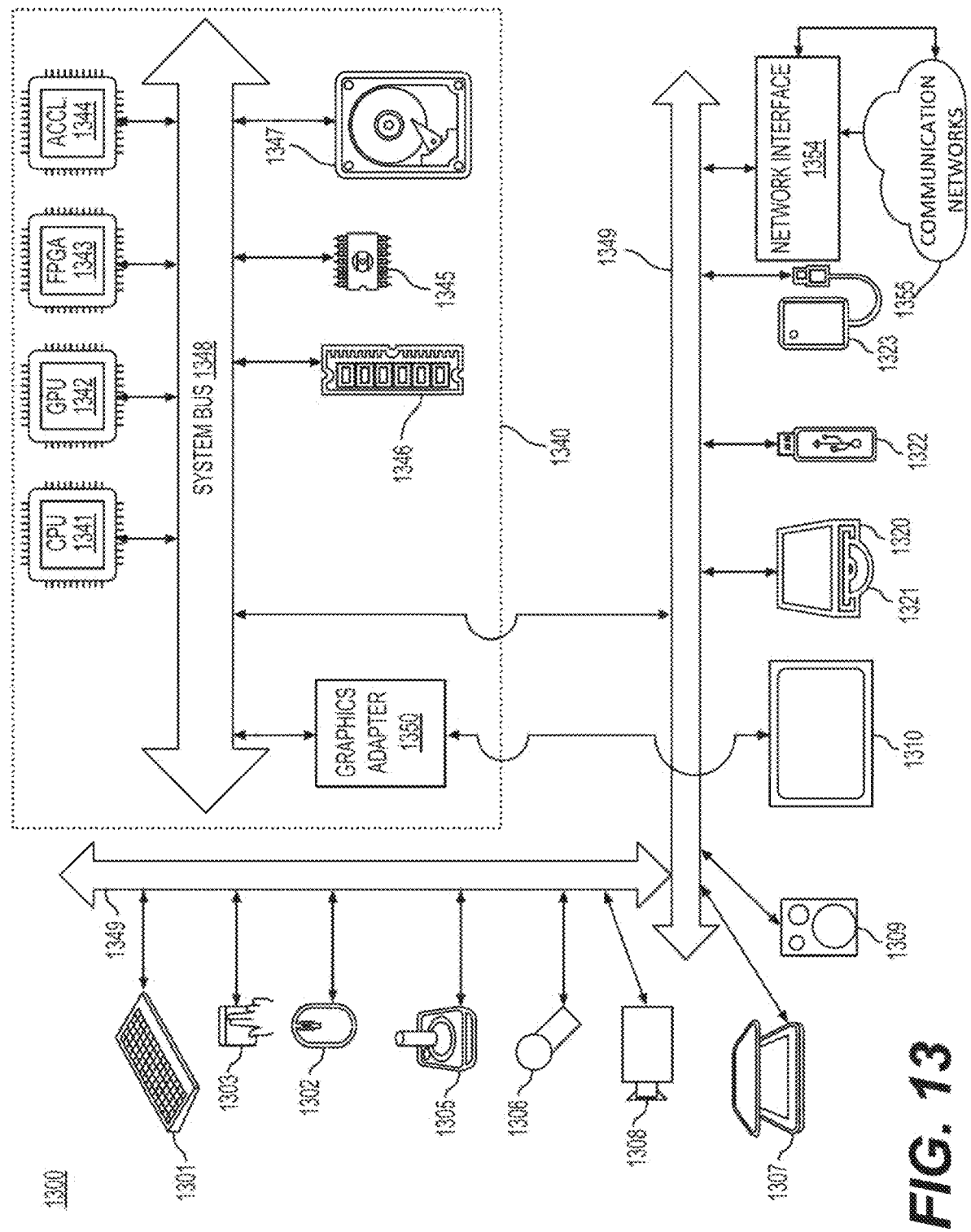
FIG. 13 shows a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1310)) can be connected to a system bus (1348) through a graphics adapter (1350).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include a network interface (1354) to one or more communication networks (1355). The one or more communication networks (1355) can for example be wireless, wireline, optical. The one or more communication networks (1355) can further be local, wide-area, metropolitan, vehicular and industrial, real-time, delay-tolerant, and so on. Examples of the one or more communication networks (1355) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through the system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

ASIC: Application-Specific Integrated Circuit
BMS: Benchmark Set
CANBus: Controller Area Network Bus
CD: Compact Disc
CPUs: Central Processing Units
CRT: Cathode Ray Tube
CTBs: Coding Tree Blocks
CTUs: Coding Tree Units
CU: Coding Unit
DVD: Digital Video Disc
FPGA: Field Programmable Gate Areas
GEO: Geometric Merge Mode:
GOPs: Groups of Pictures
GPUs: Graphics Processing Units
GSM: Global System for Mobile communications
HDR: High dynamic range
HEVC: High Efficiency Video Coding
HRD: Hypothetical Reference Decoder
IC: Integrated Circuit
JEM: Joint Exploration Model
JVET: Joint Video Exploration Team
LAN: Local Area Network
LCD: Liquid-Crystal Display
LTE: Long-Term Evolution
MV: Motion Vector
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SDR: Standard dynamic range
SEI: Supplementary Enhancement Information
SNR: Signal Noise Ratio
SSD: Solid-State Drive
TPM: Triangular partitioning mode
TUs: Transform Units,
USB: Universal Serial Bus
VUI: Video Usability Information
VVC: Versatile Video Coding

What is claimed is:

1. A method of video decoding at a video decoder, comprising:
receiving a syntax element from a bitstream of a coded video associated with a current coding block that is partitioned into a first part and a second part along a partition edge for prediction in a geometric partitioning mode;
determining a weight index at a sample position of the current coding block, the weight index being used to derive a blending weight for blending two prediction signals corresponding to the first part and the second part of the current coding block;
determining a stored motion vector type for a first motion storage unit in a motion field of the current coding block based on a motion index of the first motion storage unit, wherein the weight index at the sample position of the current coding block that is used to derive the blending weight is used as the motion index of the first motion storage unit and compared with a threshold to determine the stored motion vector type that indicates whether (i) one of two uni-predicted motion vectors respectively corresponding to the first part and the second part is stored for the first motion storage unit or (ii) a combination of the two uni-predicted motion vectors is stored for the first motion storage unit; and
storing the motion field of the current coding block based on the stored motion vector type determined for the first motion storage unit in the motion field of the current coding block,
wherein the first motion storage unit has a size of 4×4 samples, and the sample position of the current coding block at which the weight index is used as the motion index of the first motion storage unit is a preset coordinate position at coordinate (2, 2) within the first motion storage unit in the motion field of the current coding block.

2. The method of claim 1, further comprising:
performing a calculation to convert the weight index at the sample position of the current coding block to the blending weight for blending the two prediction signals, the conversion being based on a linear function of the weight index at the sample position of the current coding block without using a lookup table.

3. The method of claim 1, wherein the determining the weight index at the sample position of the current coding block includes:
determining the weight index at the sample position of the current coding block based on a value $\rho_{margin}$ used to shift the partition edge from a corner of the current coding block, the value $\rho_{margin}$ varying according to a width or a height of the current coding block and an angle of the partition edge.

4. The method of claim 1, wherein the determining the weight index at the sample position of the current coding block includes:
determining the weight index at the sample position of the current coding block based on $$wIdx(x, y) = (x - ((w \times (4n + 3i)) \gg (3 + \log_2 n))) \times \cos(\varphi) - (y - ((h \times (4n + 3i)) \gg (3 + \log_2 n))) \times \cos\left(\varphi + \frac{\pi}{2}\right)$$

where wIdx denotes the weight index, x and y denote a coordinate of the sample position in the current coding block, w and h denote a width and a height of the current coding block, φ denotes an angle of the partition edge, n denotes a number of distance quantization steps, and i denotes a distance quantization step index.

5. The method of claim 1, wherein the determining the weight index at the sample position of the current coding block includes:
determining the weight index at the sample position of the current coding block based on $$wIdx(x, y) = ((((x \ll 1) + 1) \ll 3) - (((w \times (4n + 3i)) \ll 1) \gg \log_2 n)) \times \cos[\varphi] - ((((y \ll 1) + 1) \ll 3) - (((h \times (4n + 3i)) \ll 1) \gg \log_2 n)) \times \cos\left[\varphi + \frac{\pi}{2}\right]$$

where wIdx denotes the weight index, x and y denote a coordinate of the sample position in the current coding block, w and h denote a width and a height of the current coding block, φ denotes an angle of the partition edge, n denotes a number of distance quantization steps, and i denotes a distance quantization step index.

6. The method of claim 1, wherein the determining the weight index at the sample position of the current coding block includes:

determining the weight index at the sample position of the current coding block based on $$wIdx(x, y) = \begin{cases} \left(x - \frac{w \times (4n + 3i)}{8n}\right) \times \cos(\varphi) - \\ \left(y - \frac{h \times (4n + 3i)}{8n}\right) \times \cos\left(\varphi + \frac{\pi}{2}\right), \text{ when } 0 \leq \varphi < \frac{\pi}{2} \\ \left(x - \frac{w \times (4n - 3i)}{8n}\right) \times \cos(\varphi) - \\ \left(y - \frac{h \times (4n + 3i)}{8n}\right) \times \cos\left(\varphi + \frac{\pi}{2}\right), \text{ when } \frac{\pi}{2} \leq \varphi < \pi \\ \left(x - \frac{w \times (4n - 3i)}{8n}\right) \times \cos(\varphi) - \\ \left(y - \frac{h \times (4n - 3i)}{8n}\right) \times \cos\left(\varphi + \frac{\pi}{2}\right), \text{ when } \pi \leq \varphi < \frac{3\pi}{2} \\ \left(x - \frac{w \times (4n + 3i)}{8n}\right) \times \cos(\varphi) - \\ \left(y - \frac{h \times (4n - 3i)}{8n}\right) \times \cos\left(\varphi + \frac{\pi}{2}\right), \text{ when } \frac{3\pi}{2} \leq \varphi < 2\pi \end{cases}$$

where wIdx denotes the weight index, x and y denote a coordinate of the sample position in the current coding block, w and h denote a width and a height of the current coding block, φ denotes an angle of the partition edge, n denotes a number of distance quantization steps, and i denotes a distance quantization step index.

7. The method of claim 1, wherein the determining the weight index at the sample position of the current coding block includes:

determining the weight index at the sample position of the current coding block based on a weight index of a left or upper neighboring sample of the sample position of the current coding block with a fixed offset value.

8. The method of claim 1, wherein the determining the weight index at the sample position of the current coding block includes:

determining the weight index at the sample position of the current coding block based on a weight index at a coordinate of (0, 0) in the current coding block.

9. The method of claim 1, further comprising:

determining a motion index of a second motion storage unit in the motion field of the current coding block based on $$motionIdx(x_{sb}, y_{sb}) =$$
$$((((x_{sb} \ll 3) + 1) \ll 3) - (((w \times (4n + 3i)) \ll 1) \gg \log_2 n) + 3) \times \cos[\varphi] -$$
$$((((y_{sb} \ll 3) + 1) \ll 3) - (((h \times (4n + 3i)) \ll 1) \gg \log_2 n) + 3) \times$$
$$\cos\left[\varphi + \frac{\pi}{2}\right]$$

where motionIdx denotes the motion index of the second motion storage unit, $x_{sb}$ and $y_{sb}$ denote a coordinate of the second motion storage unit in the motion field of the current coding block, w and h denote a width and a height of the current coding block, φ denotes an angle of the partition edge, n denotes a number of distance quantization steps, and i denotes a distance quantization step index.

10. An apparatus of video decoding, comprising:
circuitry configured to:
receive a syntax element from a bitstream of a coded video associated with a current coding block that is partitioned into a first part and a second part along a partition edge for prediction in a geometric partitioning mode;
determine a weight index at a sample position of the current coding block, the weight index being used to derive a blending weight for blending two prediction signals corresponding to the first part and the second part of the current coding block;
determine a stored motion vector type for a first motion storage unit in a motion field of the current coding block based on a motion index of the first motion storage unit, wherein the weight index at the sample position of the current coding block that is used to derive the blending weight is used as the motion index of the first motion storage unit and compared with a threshold to determine the stored motion vector type that indicates whether (i) one of two uni-predicted motion vectors respectively corresponding to the first part and the second part is stored for the first motion storage unit or (ii) a combination of the two uni-predicted motion vectors is stored for the first motion storage unit; and
store the motion field of the current coding block based on the stored motion vector type determined for the first motion storage unit in the motion field of the current coding block,
wherein the first motion storage unit has a size of 4×4 samples, and the sample position of the current coding block at which the weight index is used as the motion index of the first motion storage unit is a preset coordinate position at coordinate (2, 2) within the first motion storage unit in the motion field of the current coding block.

11. The apparatus of claim 10, wherein the circuitry is further configured to:
perform a calculation to convert the weight index at the sample position of the current coding block to the blending weight for blending the two prediction signals, the conversion being based on a linear function of the weight index at the sample position of the current coding block without using a lookup table.

12. A non-transitory computer-readable medium storing instructions that, when executed by a processor, cause the processor to perform a method of video decoding, the method comprising:
receiving a syntax element from a bitstream of a coded video associated with a current coding block that is partitioned into a first part and a second part along a partition edge for prediction in a geometric partitioning mode;
determining a weight index at a sample position of the current coding block, the weight index being used to derive a blending weight for blending two prediction signals corresponding to the first part and the second part of the current coding block;
determining a stored motion vector type for a first motion storage unit in a motion field of the current coding block based on a motion index of the first motion storage unit, wherein the weight index at the sample position of the current coding block that is used to derive the blending weight is used as the motion index of the first motion storage unit and compared with a threshold to determine the stored motion vector type that indicates whether (i) one of two uni-predicted motion vectors respectively corresponding to the first part and the second part is stored for the first motion storage unit or (ii) a combination of the two uni-predicted motion vectors is stored for the first motion storage unit; and storing the motion field of the current coding block based on the stored motion vector type determined for the first motion storage unit in the motion field of the current coding block, wherein the first motion storage unit has a size of 4×4 samples, and the sample position of the current coding block at which the weight index is used as the motion index of the first motion storage unit is a preset coordinate position at coordinate (2, 2) within the first motion storage unit in the motion field of the current coding block.

* * * * *